(12) United States Patent
Cros et al.

(10) Patent No.: US 6,891,304 B1
(45) Date of Patent: May 10, 2005

(54) BRUSH DC MOTORS AND AC COMMUTATOR MOTOR STRUCTURES WITH CONCENTRATED WINDINGS

(75) Inventors: Jerôme Cros, Québec (CA); Philippe Viarouge, Sainte-Foy (CA)

(73) Assignee: Quebec Metal Powders Limited, Quebec (CA)

( * ) Notice: Subject to any disclaimer, the term of this patent is extended or adjusted under 35 U.S.C. 154(b) by 0 days.

(21) Appl. No.: 09/656,085

(22) Filed: Sep. 6, 2000

(51) Int. Cl.[7] .......................... H02K 15/09; H02K 23/26
(52) U.S. Cl. ...................... 310/198; 310/234; 310/207; 29/598
(58) Field of Search .................................. 310/198, 184, 310/269, 158, 204, 207, 234, 144, 154.01–49, 40 MM, 44, 136, 148; 29/598, 597

(56) References Cited

U.S. PATENT DOCUMENTS

| | | | |
|---|---|---|---|
| 1,785,515 A | * 12/1930 | Douglas | 310/218 |
| 3,095,515 A | * 6/1963 | Case et al. | 239/267 |
| 3,515,919 A | 6/1970 | Houtman | 310/166 |
| 3,818,257 A | 6/1974 | Porter et al. | 310/179 |
| 4,197,475 A | 4/1980 | Ban et al. | 310/203 |
| 4,323,804 A | * 4/1982 | Zelt | 310/72 |
| 4,329,610 A | * 5/1982 | Klein | 310/220 |
| 4,369,388 A | 1/1983 | Ban et al. | 310/154 |
| 4,437,028 A | 3/1984 | Ikeda | 310/198 |
| 4,857,790 A | 8/1989 | Kamiyama et al. | 310/234 |
| 4,868,433 A | 9/1989 | Fujisaki | 310/40 |
| 4,876,472 A | * 10/1989 | Shiraki et al. | 310/198 |
| 5,121,021 A | * 6/1992 | Ward | 310/154.19 |
| 5,304,885 A | * 4/1994 | Wong et al. | 310/216 |

(Continued)

FOREIGN PATENT DOCUMENTS

| | | | |
|---|---|---|---|
| JP | 6-189480 | * 7/1994 | 310/52 |
| JP | 11-341722 | * 12/1999 | H02K/3/18 |
| JP | 11-341723 | * 12/1999 | H02K/23/26 |
| JP | 11-341755 | * 12/1999 | H02K/15/09 |
| WO | WO 99/50949 | 7/1999 | |

OTHER PUBLICATIONS

Anderson et al, "Electric Motors", Audel, p. 588, Aug. 1988.*

Partial translation of 11–341722, Dec. 1999.*

"Design of PM Brushless Motors Using Iron–Resin Composites for Automotive Applications", J. Cros, P. Viarouge, IEEE 1998.

"Synthesis of High Performance PM Motors with Concentrated Windings", J. Cros, P. Viarouge, IEEE 1999.

Direct–Current Machinery, Charles S. Siskind, McGraw–Hill Book Company, Inc., pp. 17–39, 1952.

*Primary Examiner*—Karl Tamai
(74) *Attorney, Agent, or Firm*—Fitzpatrick, Cella, Harper & Scinto

(57) ABSTRACT

Structures of direct current motors or ac commutator (Universal) motors which use a concentrated winding on the rotor with coils wound around the teeth. The number of commutator segments is higher than the number of rotor teeth. Several coils are wound around the same tooth. The terminals of the coils are connected to different segments of the commutator. The parallel paths of the armature winding are perfectly balanced. An equal current distribution through the parallel circuits of the armature is maintained and there is no circulation current between these parallel circuits. The problems related to commutation are reduced because the value of the coil inductances is low. The copper volume of the end-windings, the Joule losses and the axial length of the motor armature are lower than a lap or a wave winding with interlocked coils. Two kinds of structures with a concentrated winding are presented: some with rotor teeth with identical dimensions and some with rotor teeth with different dimensions.

18 Claims, 19 Drawing Sheets

U.S. PATENT DOCUMENTS

| | | | |
|---|---|---|---|
| 5,374,867 A | 12/1994 | Takehara | 310/198 |
| 5,691,590 A | 11/1997 | Kawai et al. | 310/180 |
| 5,723,931 A | 3/1998 | Andrey | 310/179 |
| 5,929,579 A | 7/1999 | Hsu | 318/439 |
| 5,949,172 A * | 9/1999 | Katagiri | 29/596 |
| 5,994,812 A | 11/1999 | Muszynski | 310/180 |
| 6,057,626 A * | 5/2000 | Tanaka et al. | 29/597 |
| 6,300,702 B1 | 10/2001 | Jack et al. | 310/216 |

\* cited by examiner

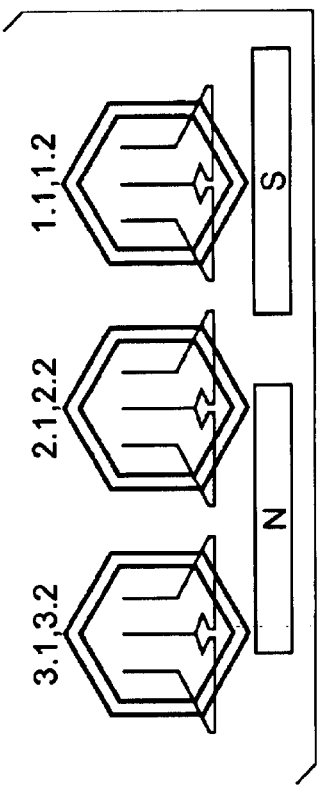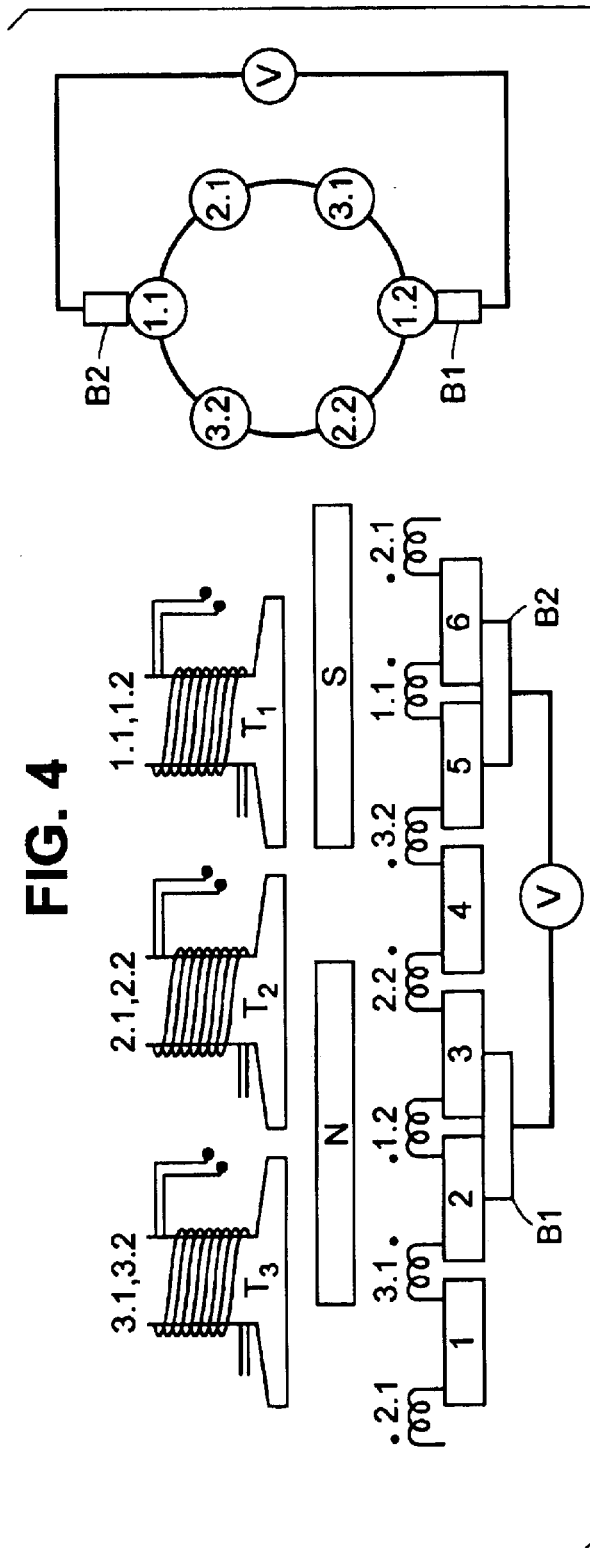
FIG. 3
FIG. 4

BRUSH DC MOTORS AND AC COMMUTATOR MOTOR STRUCTURES WITH CONCENTRATED WINDINGS

BACKGROUND OF THE INVENTION

This invention relates to direct current motors or AC commutator (Universal) motors. More particularly, this invention relates to such motors which use a concentrated winding on the rotor with coils wound around the teeth.

In conventional DC motors or AC commutator (Universal) motors, there are three types of rotor armature windings: lap windings, wave windings and frog-legs windings. These windings are made with simple coil elements which are always interlocked. With an interlocked winding, the ratio between the axial length of the end-windings and the axial length of the armature magnetic circuit is relatively high as it is described by Klein U.S. Pat. No. 4,329,610, Ban et al. U.S. Pat. No. 4,197,475 and Ikeda U.S. Pat. No. 4,437,028.

All these windings differ primarily by the method which is used to connect the terminals of the simple coils to the commutator. A lap winding is also known as a multiple winding and for this kind of winding the number of parallel paths are equal to the number of poles. The wave winding is sometimes called a series winding and it has only two paths in parallel, regardless of the number of poles. The frog-leg winding is the association of a lap winding and a wave winding placed on the same armature, in the same slots, and connected to the same commutator bars.

The most significant problem with using a lap winding is that the voltages induced in the different parallel paths are unequal. These differences of induced voltages are due to unequal magnetic circuit reluctances or unequal fluxes under the different poles, which are created by rotor eccentricity, misalignment of the poles, and/or differences in permanent magnet magnetization. Because of the imbalance in induced voltages, circulating currents appear in the windings and through the brushes. These circulating currents cause unnecessary heating of the coils and brushes and tend to produce poor commutation.

The use of equalizer connections is the common solution to overcome the undesirable effects of circulating currents. These connections improve the current commutation and relieve the brushes of existing circulating currents by providing low resistance paths which by-pass the brush contacts. In a wave winding, the problem of the circulating currents due to the unbalanced voltages of the parallel paths is minimized but it is also impossible to get perfectly balanced voltages.

To avoid the interlocking of the coils, it is possible to directly wind the armature simple coils around each tooth of the rotor magnetic circuit. This kind of winding is called a concentrated winding, as described in our scientific papers, "Permanent Magnet Brushless DC Motor with Soft Metal Powder for Automotive Applications," IEEE Industry Applications Society, St. Louis, October 1998, and "Synthesis of High Performance PM Motors with Concentrated Windings," IEEE IEMDC, Seattle, May 1999. This kind of winding is also called a non-superposed winding, as described by Ban et al. U.S. Pat. No. 4,197,475. This kind of winding reduces the copper volume of the end-winding, the copper losses and the total axial length of the motor. The efficiency is improved when compared to the efficiency of classical structures. This winding structure is also easier to realize than a lap winding or a wave winding. When the axial length of the motor is small and the outside diameter of the motor is important, the use of such a winding structure allows a gain of 70% as compared to the volume of copper used in an overlapped winding.

Rotor structures with a concentrated winding have a small number of slots and the magnetic circuit is easier to realize. The magnetic circuit can be realized with a conventional soft magnetic laminated material (a yoke made of a stack of laminations) but it is also possible to use a soft magnetic composite material made of metal powder. The permeability of the soft magnetic composite is usually three times lower than the permeability of the conventional laminated materials like it is described by Jack et al. W.O. Pat No. 99,50949. This low value of permeability reduces the value of the coil inductances in the armature and the commutation process in both collector and armature is improved. A rotor structure with a small number of slots is also very well adapted to the realization of the armature magnetic circuit of direct current motors or ac commutator (Universal) motors with a soft magnetic composite material made of metal powder. With a small number of slots having relatively large dimension, the mechanical constraints on the direct molding process of the rotor yoke are reduced. It is also possible to easily insert the end-windings in the active part of the rotor magnetic circuit. This axial insertion of the end-windings improves the reduction of the volume of copper and the total axial length of the motor.

However, the concentrated winding technique is too often associated and restricted to windings with a short pitch, i.e. windings with lower performances than the performances of the classical winding structures. The concentrated windings with a short pitch are then limited to sub-fractional power applications (lower than 100 W) such as used in electrical motors for computer peripherals or toys. This is the case for the simplest and low cost brush direct current motor, which is widely used for toys. This 2-pole motor uses permanent magnets on the stator core, and has three teeth on its rotor core and a concentrated winding with one coil only wound around each tooth. The armature coil terminals are connected to a commutator with three segments and two brushes, as described by Fujisaki et al. U.S. Pat. No. 4,868,433. This structure has a winding with a short pitch of 120 electrical degrees. The winding coefficient or the ratio between the fundamental component of magnetic flux embraced by the winding and the total magnetic flux per pole is only equal to 0.866.

The main drawbacks of this motor structure are its low performance in terms of torque to weight ratio, torque ripple, and poor commutation performance if the power is increased. With this structure, the induced voltages in the coil paths between brushes are not always balanced. This unbalanced condition of operation produce supplementary losses, torque ripples, mechanical vibrations and commutation problems. These problems are acceptable for low power applications only.

SUMMARY OF THE INVENTION

This invention is an armature winding of a DC or AC commutator motor, which eliminates the problem of the interlocking of the coils and the problem of circulating currents. All the path voltages are perfectly balanced and the current commutation is improved when compared to the classical structures.

In this invention, the number of commutator segments is higher than the number of rotor teeth, and a plurality of simple coils are wound around the same tooth. The leads of each coil are connected to different segments of the commutator. Use of the present invention reduces the number of turns per coil for a same value of the DC voltage supply and a same speed range of the motor. The parallel paths of the armature winding can be perfectly balanced. An equal current distribution through the parallel circuits of the armature is maintained and there is no circulation current between these parallel circuits. The inductance value of each simple coil is reduced and consequently the commutation problems are minimized when compared to the case of a concentrated winding with only one coil wound around each tooth. The copper volume of the end-windings, the Joule losses and the axial length of the motor armature are lower than in the case of a lap or a wave winding with interlocking coils. It is also possible to arrange connections of the leads of each coil to the commutator segments to obtain balanced emf in the different coil paths between brushes. These structures can be used efficiently for motors over a wide range of power, and their cost of realization is lower than the cost of classical structures.

In accordance to this invention, two kinds of structures are presented: structures with a regular distribution of rotor teeth with identical dimensions, and structures with a regular distribution of rotor teeth with different dimensions. Both structures are efficient in terms of performance and cost of realization. The values of the winding coefficients of these structures (i.e. the ratio between the fundamental component of magnetic flux embraced by the winding and the total magnetic flux per pole) are high.

The performance of the structures proposed in accordance with the present invention is similar to the performance of the classical structures in terms of current commutation. But the performance of the structures proposed in accordance with the present invention in terms of torque to winding volume ratio is higher than the performance of the classical structures. With the proposed structures, the volume of copper is reduced, the Joules losses (copper losses) and the weight are minimized. The total axial length of the motor is reduced. The efficiency is improved and is higher than in the case of classical structures. The structures of the winding and the magnetic circuit, which are proposed in accordance with the present invention, are also easier to realize. The total cost of the motor is then minimized.

BRIEF DESCRIPTION OF THE DRAWINGS

FIG. 3 is a diagram of construction of a machine equivalent to the machine of FIG. 2 with a rotor winding made of concentrated windings wound around the teeth.

FIG. 4 is a developed diagram of a machine with 3 rotor slots, 2 stator poles, 6 commutator segments and 2 brushes with a rotor winding made of concentrated windings wound around the teeth.

DESCRIPTION OF THE PREFERRED EMBODIMENTS

Figure 1:
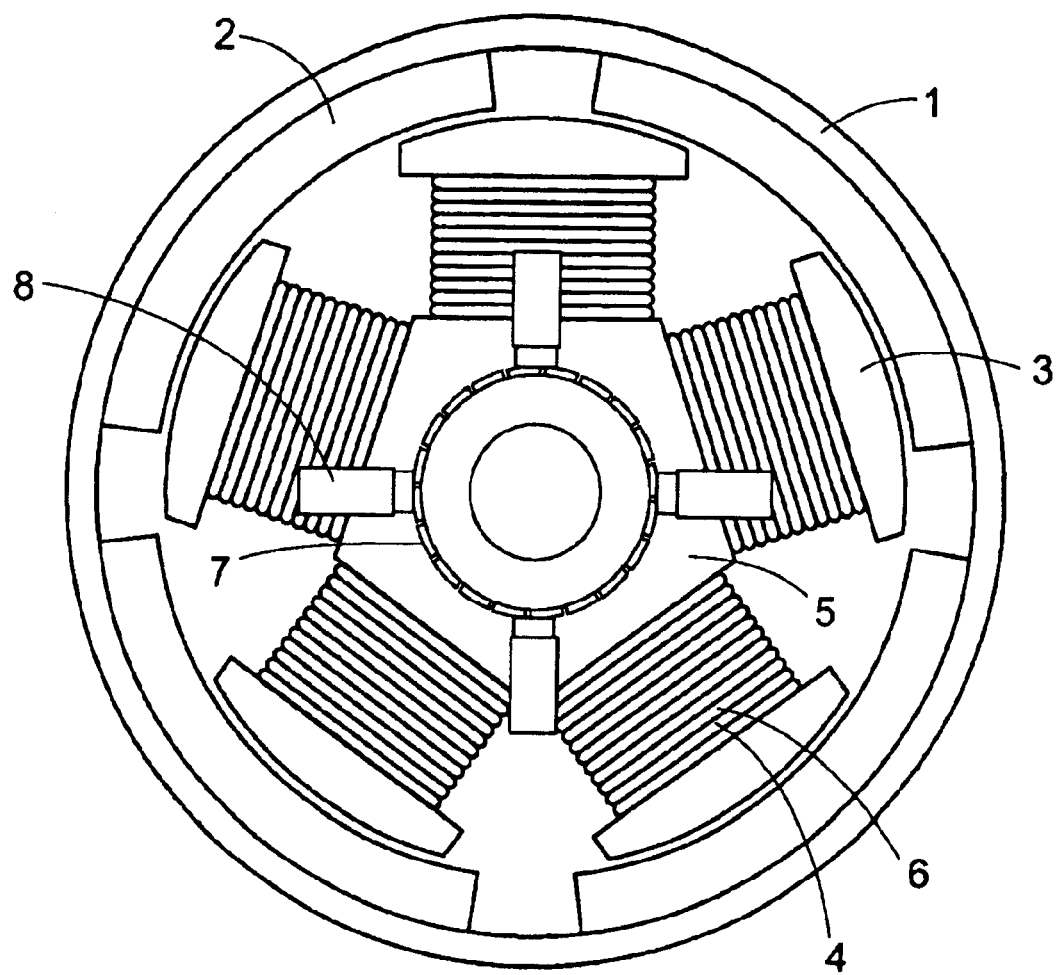
FIG. 1 is a cross-sectional view of an example of a direct current motor with a concentrated winding and permanent magnets in accordance with the present invention.

In one embodiment of the present invention, the rotor has a regular distribution of rotor teeth with identical dimensions, and there are 2P poles, magnetized alternatively North and South in the stator. These poles can be constructed with segments of permanent magnet mounted on the surface of a core made of soft magnetic material or with coils wound around teeth made of soft magnetic material and fed by a DC or AC current. The rotor core has S slots. The simple coils of the rotor are wound around S teeth or in some case around S/2 teeth only. There are z segments on the commutator which are connected to the terminals of the coils. 2B brushes are sliding on the commutator surface when the rotor is rotating. The characteristics of these machines respect the following conditions:

| | |
|---|---|
| P is an integer and | $0 < P < 10$ |
| $S = 2P + A$ | A is an integer equal to $-1$ or $1$ or $2$ or $S > 2$ |
| $Z = k*LCM(S,2P) \pm n$ | k is an integer greater than 0 |
| | LCM is the Least Common Multiple of S and 2P |
| | n is equal to 0 or k |
| B = P or less | |

Table 1 hereto presents some structures which respect these conditions with k equal to 1 and n equal to 0. The number of coils per path is equal to mph (mph=Z/2P). The number of brushes 2B is normally equal to the number of stator poles 2P. Several concentric coils are wound around each rotor tooth and are connected on different commutator segments. In this case, the number N of concentric coils per tooth is equal to:

$$N = Z/S$$

With this winding configuration, a reduction of the number of turns per simple coil is obtained. The same reduction of the number of turns is usually obtained in a classical machine structure with the same number of stator poles by employing a higher number of rotor slots. Because the inductance value of each simple coil is reduced, commutation problems are minimized.

It is also possible to arrange the connections of each coil to the commutator segments to obtain balanced emf's in the different coil paths between brushes. Such structures can have a value of winding coefficient Kb (ratio between the fundamental component of magnetic flux embraced by the winding and the total magnetic flux per pole) near to 1 (table 1) and consequently a high torque-weight ratio. All these machines can be used efficiently for motors and generators over a wide range of power and for high levels of armature current.

TABLE 1

| 2P | 2 | 4 | 4 | 6 | 6 | 6 | 8 | 8 | 8 | 10 | 12 |
|---|---|---|---|---|---|---|---|---|---|---|---|
| S | 3 | 5 | 6 | 5 | 7 | 8 | 7 | 9 | 10 | 12 | 15 |
| Z = LCM (S, 2) | 6 | 20 | 12 | 30 | 42 | 24 | 56 | 72 | 40 | 60 | 60 |
| Mph = Z/2P | 3 | 5 | 3 | 5 | 7 | 4 | 7 | 9 | 5 | 6 | 5 |
| 2B | 2 | 4 | 4 | 6 | 6 | 6 | 8 | 8 | 8 | 10 | 12 |
| N | 2 | 4 | 2 | 6 | 6 | 3 | 8 | 8 | 4 | 5 | 4 |
| Kb | 0.866 | 0.951 | 0.866 | 0.951 | 0.975 | 0.924 | 0.975 | 0.984 | 0.951 | 0.965 | 0.951 |

It is additionally possible to reduce the number of brushes 2B and also the number N of concentric coils which are wound around the same rotor tooth to minimize the cost of the motor. Motors having such a structure are presented in table 2. The structures listed in column 2 to 11 of table 1 present this characteristic. It is then necessary to add some equalizer connections on the commutator segments (wires which directly connect segments without lying in the slots, see for example wire conecting segment 3 to 9 in FIG. 6). It should be noted that this modification decreases the performance of the commutation process, while increasing the level of current in the remaining brushes. This kind of modification is preferably utilized in sub-fractional and fractional power machines.

TABLE 2

| 2P | 2 | 4 | 4 | 6 | 6 | 6 | 8 | 8 | 8 | 10 |
|---|---|---|---|---|---|---|---|---|---|---|
| S | 3 | 5 | 6 | 5 | 7 | 8 | 7 | 9 | 10 | 12 |
| Z = LCM (S, 2) | 6 | 20 | 12 | 30 | 42 | 24 | 56 | 72 | 40 | 60 |
| mph = Z/2P | 3 | 5 | 3 | 5 | 7 | 4 | 7 | 9 | 5 | 6 |
| 2B | 2 | 2 | 2 | 2 | 2 | 2 | 2 or 4 | 2 or 4 | 2 | 2 |
| N | 2 | 2, 4 | 1, 2 | 2, 6 | 2, 6 | 1, 3 | 2, 4, 8 | 2, 4, 8 | 2, 4 | 1, 5 |
| Kb | 0.866 | 0.951 | 0.866 | 0.951 | 0.975 | 0.924 | 0.975 | 0.984 | 0.951 | 0.965 |

It is also possible to reduce the number of commutator segments Z by two and to apply the following relations to determine the number of segments:

$$Z = LCM(S, 2P)/2 \text{ and } Z/2P > 3$$

With this reduction of the number of segments, as in the structures presented in table 3, one obtains an unbalanced emf in the different coil paths between brushes, with the level of this unbalance being inversely proportional to the number of coils in each parallel path.

TABLE 3

| 2P | 4 | 6 | 6 | 8 | 8 | 8 | 10 | 12 | 12 |
|---|---|---|---|---|---|---|---|---|---|
| S | 5 | 5 | 7 | 7 | 9 | 10 | 11 | 11 | 15 |
| Z = LCM (S, 2P)/2 | 10 | 15 | 21 | 28 | 36 | 20 | 55 | 66 | 30 |
| 2 mph = Z/2P | 5 | 5 | 7 | 7 | 9 | 5 | 11 | 11 | 5 |
| 2B | 4 | 6 | 6 | 8 | 8 | 8 | 10 | 12 | 12 |
| N | 2 | 3 | 3 | 4 | 4 | 2 | 5 | 6 | 2 |
| Kb | 0.951 | 0.951 | 0.975 | 0.975 | 0.984 | 0.951 | 0.990 | 0.990 | 0.951 |

In a second embodiment of the present invention, the rotor of these structures presents a regular distribution of rotor teeth with different dimensions.

In particular, the stator of these machines have 2P poles magnetized alternatively North and South. These poles can be realized with permanent magnet segments mounted on the surface of a core made of soft magnetic material, or with coils wound around teeth made of soft magnetic material and fed by a DC or AC current. The rotor core has S slots and rotor teeth of two different geometrical dimensions, which alternate around the circumference of the core. The rotor coils are wound around S/2 teeth. There are Z segments on the commutator which are connected to the terminals of the coils. 2B brushes slide on the commutator surface when the rotor is rotating. The characteristics of these machines respect the following conditions:

| P is an integer and | $1 < P < 10$ |
|---|---|
| S = 2P + 2A | A is an integer and $1 < A < P$ |
| Z = k*LCM(S/2,2P) ± n | k is an integer greater than 0 |
| | LCM is the least Common 1 |
| | Multiple of S/2 and 2P |
| | n is equal to 0 or k |
| B = P or less | |

Table 4 herein provides exemplary structures which respect these conditions, with k equal to 1 and n equal to 0. The number of coils per path is equal to mph (mph=Z/2P). The number of brushes 2B is normally equal to the number of stator poles 2P. Several concentric coils are wound around each rotor tooth and are connected on different commutator segments. In this case, the number N of concentric coils wound around each rotor tooth is equal to:

$$N = 2Z/S$$

TABLE 4

| 2P | 4 | 6 | 6 | 8 | 8 | 8 | 10 | 10 | 10 | 10 |
|---|---|---|---|---|---|---|---|---|---|---|
| S | 6 | 8 | 10 | 10 | 12 | 14 | 12 | 14 | 16 | 18 |
| Z = LCM (S/2, 2P) | 12 | 12 | 30 | 40 | 24 | 56 | 60 | 70 | 40 | 90 |
| mph = Z/2P | 3 | 4 | 5 | 5 | 3 | 7 | 3 | 7 | 4 | 9 |
| 2B | 4 | 6 | 6 | 8 | 8 | 8 | 10 | 10 | 10 | 10 |
| N | 4 | 3 | 6 | 8 | 4 | 8 | 10 | 10 | 5 | 10 |
| Kb | 1 | 1 | 1 | 1 | 1 | 1 | 1 | 1 | 1 | 1 |

These motor structures offer the same advantages of the previous ones listed in table 1 in terms of current commutation performance and balanced parallel coils path. But it is also possible to get a higher winding coefficient Kb (equal to unity, Kb=1), and to maximize the torque per unit of volume of copper. These structures can be used efficiently for motors and generators over a wide power range and for high levels of armature current. It is also possible, as in the case of the previous structures of table 1, to apply different simplifications for the choice of the number of brushes, the number commutator segments and the number of concentric coils per tooth to reduce the cost of the motor and simplify the realization.

It must be noticed that all the proposed solutions which are in accordance with the present invention can be used with different brush widths.

According to the present invention, a DC or AC commutator motor can be manufactured with a magnetic circuit made of laminated steel or made of a soft magnetic composite material.

In particular, when an isotropic soft magnetic composite is used, a portion of the magnetic flux can also circulate in the axial direction. For this reason, it is possible to expand the tooth tips in the axial direction, and thus maximize the axial length of the active air-gap area for a given total axial length of the motor as fixed by the specifications of the application. In such structures, the air-gap flux is concentrated into the center part of the rotor teeth under the coils and the yoke. Because the axial length of the center part of the rotor teeth under the coils and the axial length of the yoke is smaller than the axial length of the tooth tips, the end-windings, the commutator and the brushes are now axially inserted and the total axial length of the motor is reduced. With this method, the isotropic properties of the soft magnetic composites are used to minimize the axial length of a motor without reducing the torque performance.

When an isotropic soft magnetic composite is used, the cross-section profile of the center part of the rotor and stator teeth under the coils can be made round, oval, or circular. These profiles can reduce the risk of destruction of the insulation by a sharp bending of the winding coils, and maximize the copper filling factor.

It is also possible to skew the permanent magnets or the teeth of the stator to reduce the variations of the air-gap reluctance or the cogging torque. The same result can be obtained by skewing the teeth of the rotor. When an isotropic soft magnetic composite is used, it is possible to skew only the tooth tips.

FIG. 1 shows a cross-sectional view of an example of a direct current motor with a concentrated winding and permanent magnets in accordance with the present invention. Part 1 is the yoke of the stator. Part 2 is one of the stator poles, which are magnetized alternatively North and South, and which is made of a segment of permanent magnet. Part 3 is the tip of a rotor tooth. Part 4 is the center part of the rotor tooth under the coils. Part 5 is the yoke of the rotor. Part 6 is the concentrated winding, wound around a rotor tooth. Part 7 is one of the segments or bars of the commutator. Part 8 is one of the brushes in contact with the segments of the commutator and which is used to feed the supply current to the armature winding.

Figure 2:
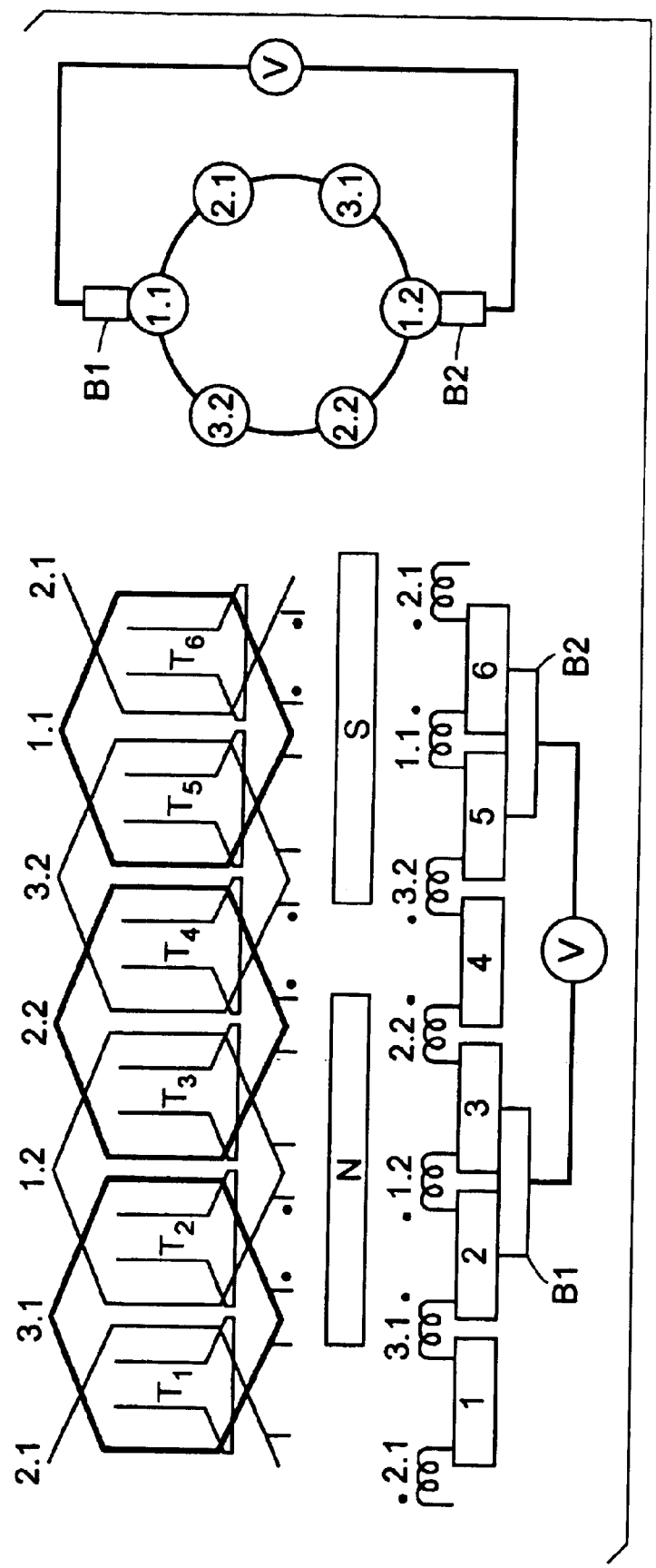
FIG. 2 is a diagram of a developed surface of a drum armature, made by unrolling the periphery of the armature and commutator into a plane.

FIGS. 2, 3 and 4 each illustrates a method to derive the structure of a machine with a rotor winding made of concentrated windings wound around the teeth from the structure of a classical machine. Each of these structures presents the same number of stator poles, and a commutator segment number equal to the rotor slot number.

More particularly, FIG. 2 shows a classical structure with 6 rotor slots, 2 stator poles, 6 segments on the commutator and 2 brushes. The winding of the rotor is a simplex lap winding, overlapped with a short pitch of 120 electric degrees. The connections of the terminals of each simple coil to the segments of the commutator are arranged to get coils paths perfectly balanced in the armature winding.

In FIG. 2, the 6 simple coils of the armature winding are denoted 1.1, 1.2, 2.1,2.2,3.1,3.2. Coils 1.1 and 1.2 denote simple coils which have the same phase of emf, because their positions relative to the stator poles are identical. The same is the case with coils 2.1, 2.2, and with coils 3.1, 3.2. The dots in FIG. 2 are polarity marks and indicate the polarity of the winding, in accordance with standard notation in the art. The teeth defining the 6 rotor slots are defined by T1 through T6, respectively. The commutator segments are labeled 1 through 6 respectively, and as can be seen, a voltage V is applied to the brushes B1, B2. The north and south stator poles are labeled N and S, respectively. Similar nomenclature is used in the balance of the figures.

In comparison with FIG. 2, by regrouping simple coils which have the same phase of emf on the same tooth of the rotor, one avoids the interlocking of the end-windings, as is shown on FIG. 3. More particularly, FIG. 3 is a diagram of construction of a machine equivalent to the machine of FIG. 2 in terms of torque and emf characteristics, magnetic flux and current density, where the rotor winding in FIG. 3 is made of concentrated windings around the teeth. The simple coils having emf's which are in phase as coils 1.1 and 1.2 in FIG. 2 are regrouped on a same tooth. To increase the size of the slots filled with conductors and to preserve the same total copper section of the whole rotor armature in the original machine of FIG. 2 and in the equivalent machine of FIG. 3 (i.e. the sum of the copper section of each slot), the teeth around the empty slots are regrouped to form the new distribution of teeth presented in FIG. 3.

As compared to FIG. 2, the position of the tooth tips in FIG. 3 are not modified at the level of the airgap; however the center parts of the teeth of the machine of FIG. 2 between the tooth tips and the inner rotor yoke have been shifted in FIG. 3 to form a single big tooth. With this method, the pattern of the no-load magnetic flux spatial distribution in the airgap is not modified and the total section of the soft magnetic material in the teeth from the original machine of FIG. 2 to the equivalent machine of FIG. 3 is also preserved to avoid a saturation of the magnetic flux. Therefore the total amounts of soft magnetic material in the yoke and copper in the slots are modified as well. One gets a machine with a concentrated winding presented in FIG. 3 which is equivalent to the initial machine of FIG. 2, as explained above. The shape and the emf amplitude in each coil are not modified.

As shown in FIG. 3, some slots are empty and it is possible to group teeth around each empty slot. The position of the tooth tips are not modified at the level of the airgap, only the center parts of the teeth between the tooth tips and the inner rotor yoke are shifted to form a single big tooth. The pattern of the no-load magnetic flux spatial distribution in the airgap is not modified, as is shown in FIG. 3. One can then concentrate the simple coils around each tooth. The total section of soft magnetic material in the teeth and the total copper section of the whole rotor armature are preserved and are identical to the corresponding sections in the initial machine with a classical structure.

FIG. 4 is a developed diagram of a machine with 3 rotor slots, 2 stator poles, 6 commutator segments and 2 brushes with a rotor winding made of concentrated windings wound around the teeth. Two simple coils, like coils 1.1 and 1.2, are wound around the same tooth and are connected to different segments of the commutator. The connections to the commutator segments are identical to the connections used in the machine shown in FIG. 2.

One can notice on the diagram on the right that the coils paths are not modified. Each simple coil wound around a same tooth like coil 1.1 and coil 1.2 has an identical emf. The total emf's across each parallel coil path are now perfectly balanced, even if the airgap reluctances or the magnetization of the permanent magnets under each pole of the stator are not perfectly identical. This machine is equivalent to the machine presented in FIG. 2 in terms of torque and emf characteristics, magnetic flux density and current density.

The machine presented on the FIG. 4 has a concentrated winding, which is equivalent to the initial machine of FIG. 2, in terms of torque and emf characteristics, magnetic flux and current density. The connections of the terminals of the simple coils to the commutator are identical in both machines (i.e. machines on FIG. 2 and FIG. 4). The coil paths in the armature winding are always balanced: i.e. the total emf's across each parallel coil path are balanced, even if the airgap reluctances or the magnetization of the permanent magnets under each pole of the stator are not perfectly identical.

Figure 5:
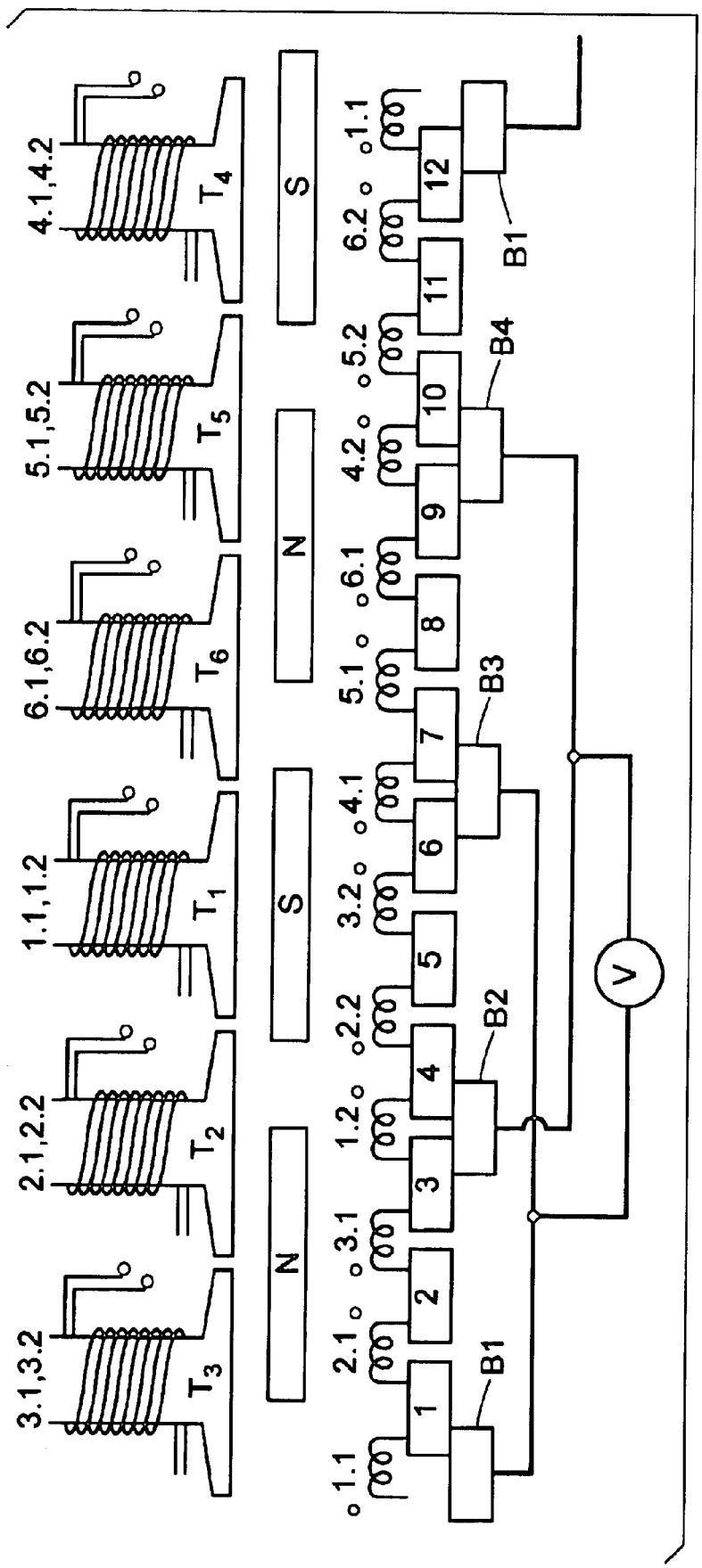
FIG. 5 is a developed diagram of a machine with 6 rotor slots, 4 stator poles, 12 commutator segments and 4 brushes with a rotor winding made of concentrated windings wound around the teeth.

FIG. 5 is a developed diagram of a machine with 6 rotor slots, 4 stator poles, 12 commutator segments and 4 brushes with a rotor winding made of concentrated windings wound around the teeth. This machine is derived from the machine presented in the FIG. 4 by doubling the periodicity of its structure.

Figure 6:
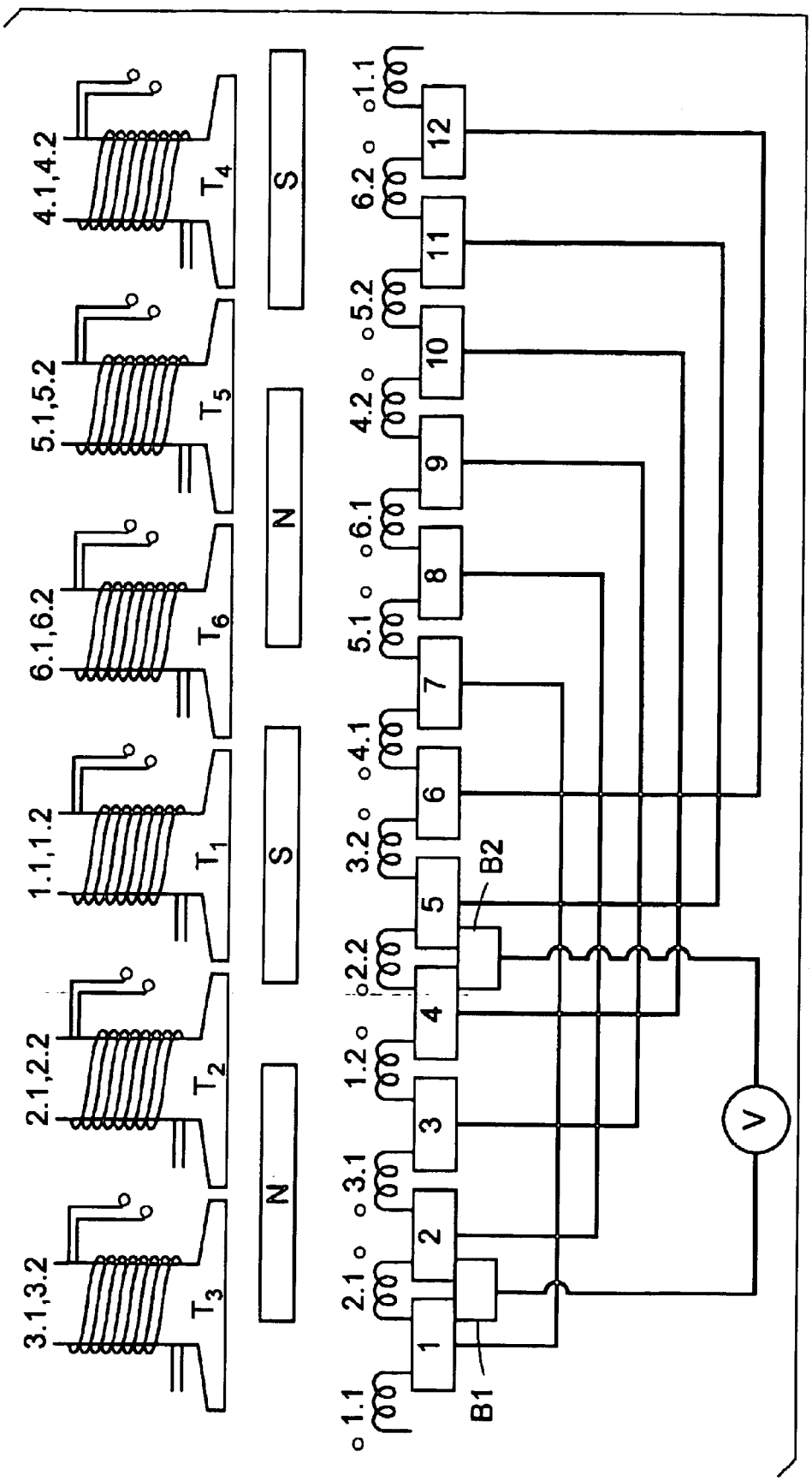
FIG. 6 is a developed diagram of a machine with 6 rotor slots, 4 stator poles, 12 commutator segments and 2 brushes with a rotor winding made of concentrated windings wound around the teeth.

In addition, several modifications can be realized to simplify these structures in the case of a sub-fractional power machine made in accordance to the present invention. In particular, it is possible to reduce the number of brushes while adding equalizer connections on the commutator. This is shown in FIG. 6, which is a developed diagram of a machine with 6 rotor slots, 4 stator poles, 12 commutator segments and 2 brushes with a rotor winding made of concentrated windings wound around the teeth. This machine is an evolution of the machine presented in FIG. 5 with a reduced number of brushes and with equalizer connections added on the commutator. It can be seen in FIG. 6 that the two coils wound around each tooth are connected in parallel by equalizer connections. Optionally, one could reduce the number of simple coils around each tooth to one, with several of the commutator segments not being directly connected to coil terminals.

Figure 7:
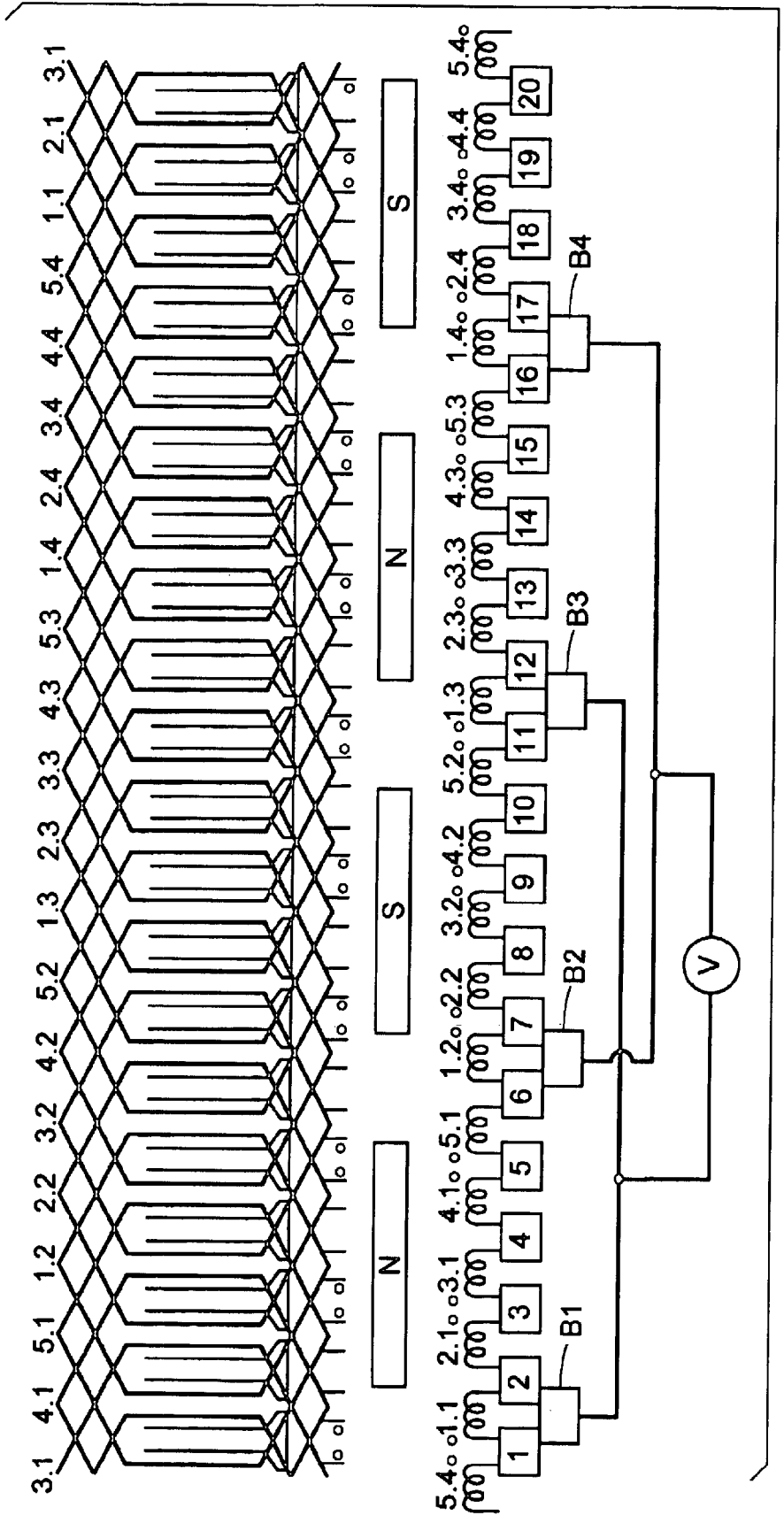
FIG. 7 is a diagram of a machine with 20 rotor slots, 4 stator poles, 20 commutator segments, 4 brushes with a simplex lap winding and a short pitch from 1 to 5.
Figure 8:
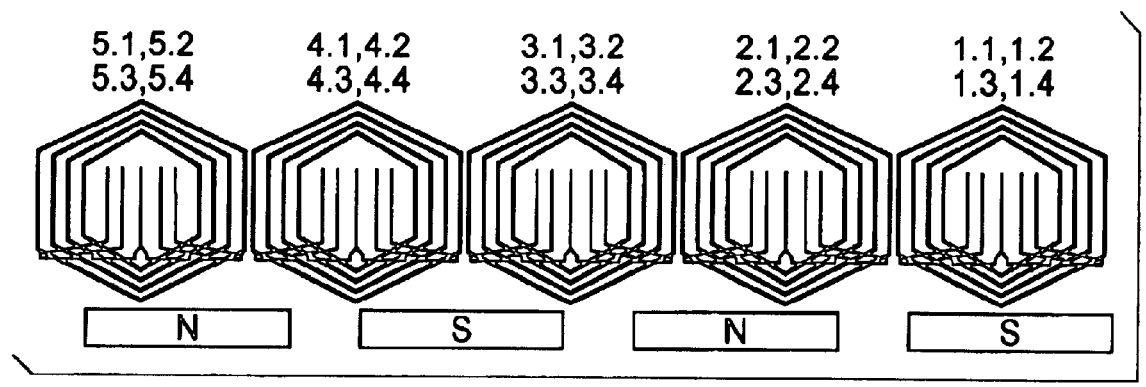
FIG. 8 is a diagram of construction of a machine equivalent to the machine of FIG. 7 with a rotor winding made of concentrated windings wound around the teeth.
Figure 9:
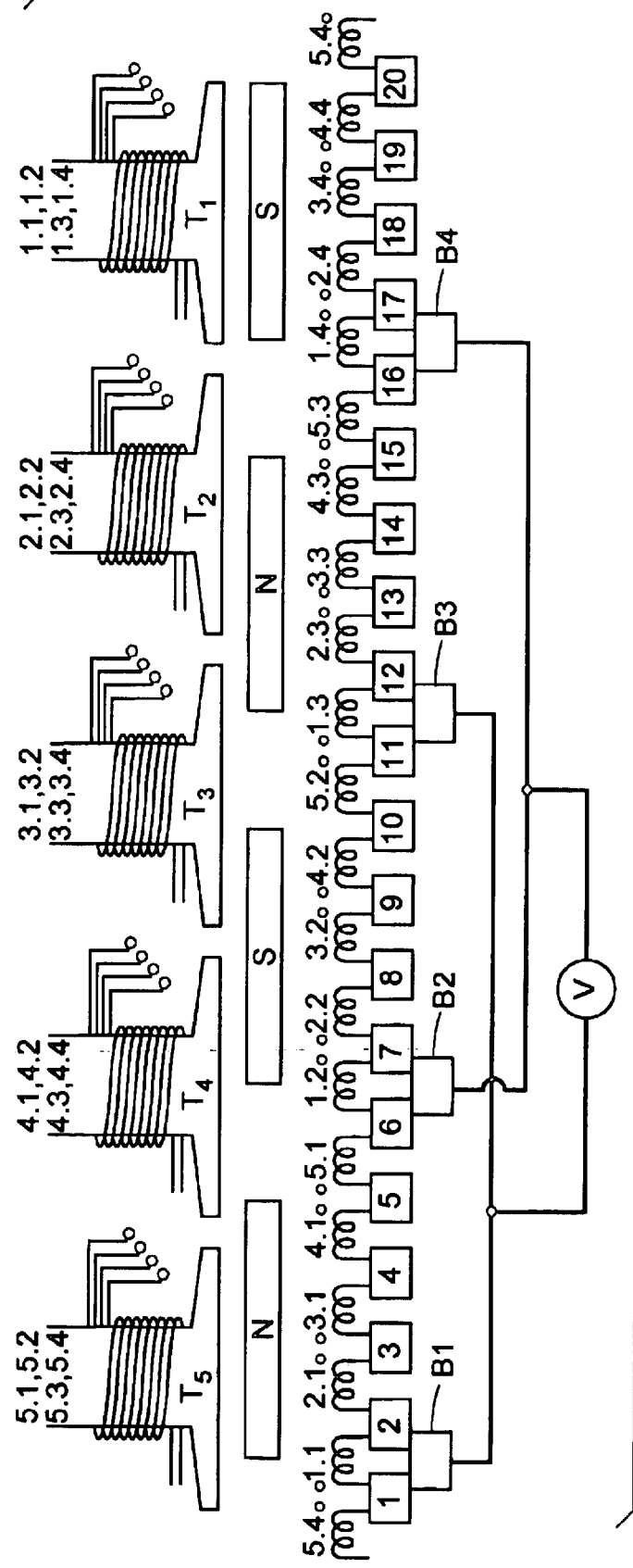
FIG. 9 is the diagram of a machine with 5 rotor slots, 4 stator poles, 20 commutator segments and 4 brushes with a rotor winding made of concentrated windings wound around the teeth.

The same method is applied on FIGS. 8 and 9 for another example, in accordance to the present invention. Initially FIG. 7 depicts a classical machine having 20 rotor slots, 4 stator poles, 20 segments on the commutator and 4 brushes. The winding of the rotor is overlapped with a short pitch of 1 to 5. The coil paths in the armature winding are presented on FIG. 10.

FIG. 8 is a diagram of the construction of a machine equivalent to the machine of FIG. 7 in terms of torque and emf characteristics, magnetic flux and current density, with the rotor winding in FIG. 8 made of concentrated windings wound around the teeth. The coils having emf's which are in phase as coils 1.1, 1.2, 1.3, 1.4 are regrouped on a same tooth. To increase the size of the slots filled with conductors and to preserve the same total copper section of the whole rotor armature in the original machine of FIG. 7 and in the equivalent machine of FIG. 8 (i.e. the sum of the copper section of each slot), the teeth around the empty slots are regrouped to form the new distribution of teeth presented in FIG. 8. The position of the tooth tips are not modified at the level of the airgap, only the center parts of the teeth of the machine of FIG. 7 between the tooth tips and the inner rotor yoke have been shifted to form a single big tooth. With this method, the pattern of the no-load magnetic flux spatial distribution in the airgap is not modified. The total section of soft magnetic material in the teeth from the original machine of FIG. 7 to the equivalent machine of FIG. 8 is also preserved to avoid saturation of the magnetic flux. Therefore the total amounts of soft magnetic material in the yoke and copper in the slots are not modified as well. One gets a machine with a concentrated winding presented in FIG. 8 which is equivalent to the initial machine of FIG. 7, as explained above. The shape and the emf amplitude in each coil are not modified.

FIG. 9 is the diagram of a machine with 5 rotor slots, 4 stator poles, 20 commutator segments and 4 brushes with a rotor winding made of concentrated windings wound around the teeth. Four simple coils are wound around a same tooth and are connected to different segments of the commutator. Connections to the commutator segments are identical to the connections used in the machine presented on the FIG. 7. Each simple coil wound around a same tooth, like coils 1.1 and 1.2 and 1.3 and 1.4, has an identical emf. The total emf's across each parallel coil path (FIG. 10) are now perfectly balanced, even if the airgap reluctances or the magnetization of the permanent magnets under each pole of the stator are not perfectly identical. This machine is equivalent to the machine presented in FIG. 7 in terms of torque and emf characteristics, magnetic flux density and current density.

Figure 10:
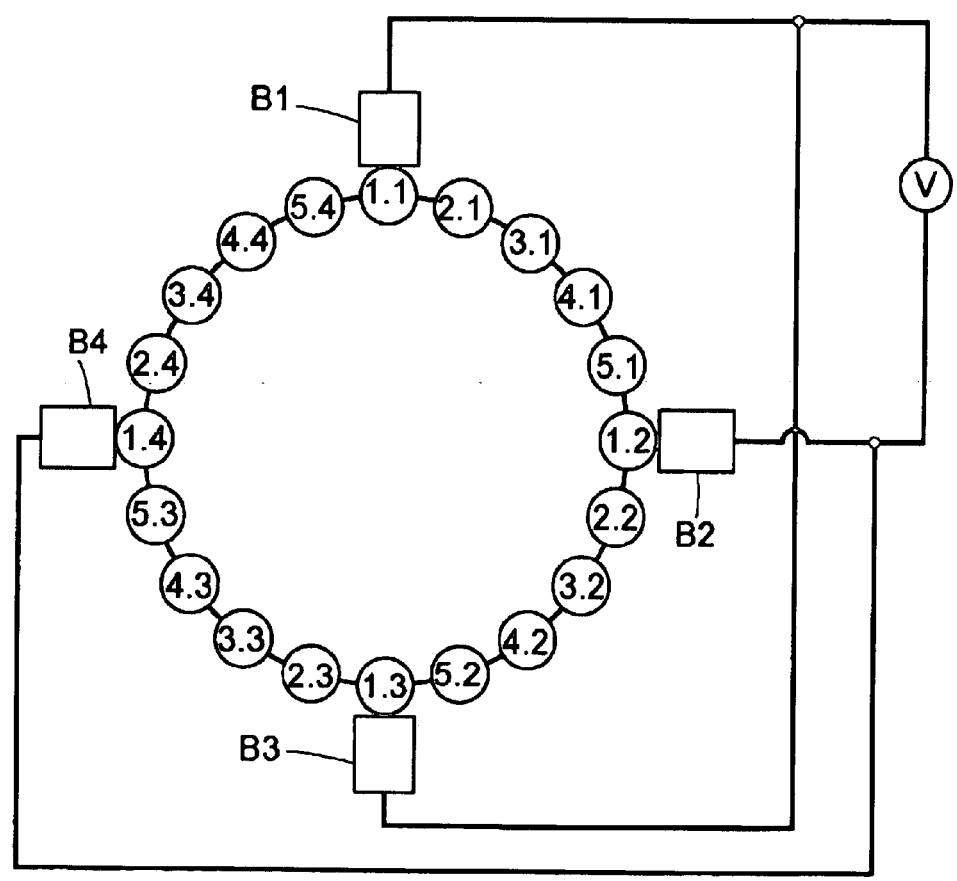
FIG. 10 is a diagram of the parallel coils paths of the machines presented in FIG. 7 and FIG. 9.

FIG. 10 is a diagram of the parallel coils paths of the machines presented in FIG. 7 and FIG. 9.

Several modifications can be realized to simplify these structures in the case of a sub-fractional power machine in accordance to the present invention. It is possible to reduce the number of brushes while adding equalizer connections on the commutator. One can also reduce the number of simple coils as it is presented on the FIG. 11. In accordance to the present invention, FIG. 12 shows the same kind of motor as is depicted in FIG. 9 with a higher periodicity of structure.

Figure 11:
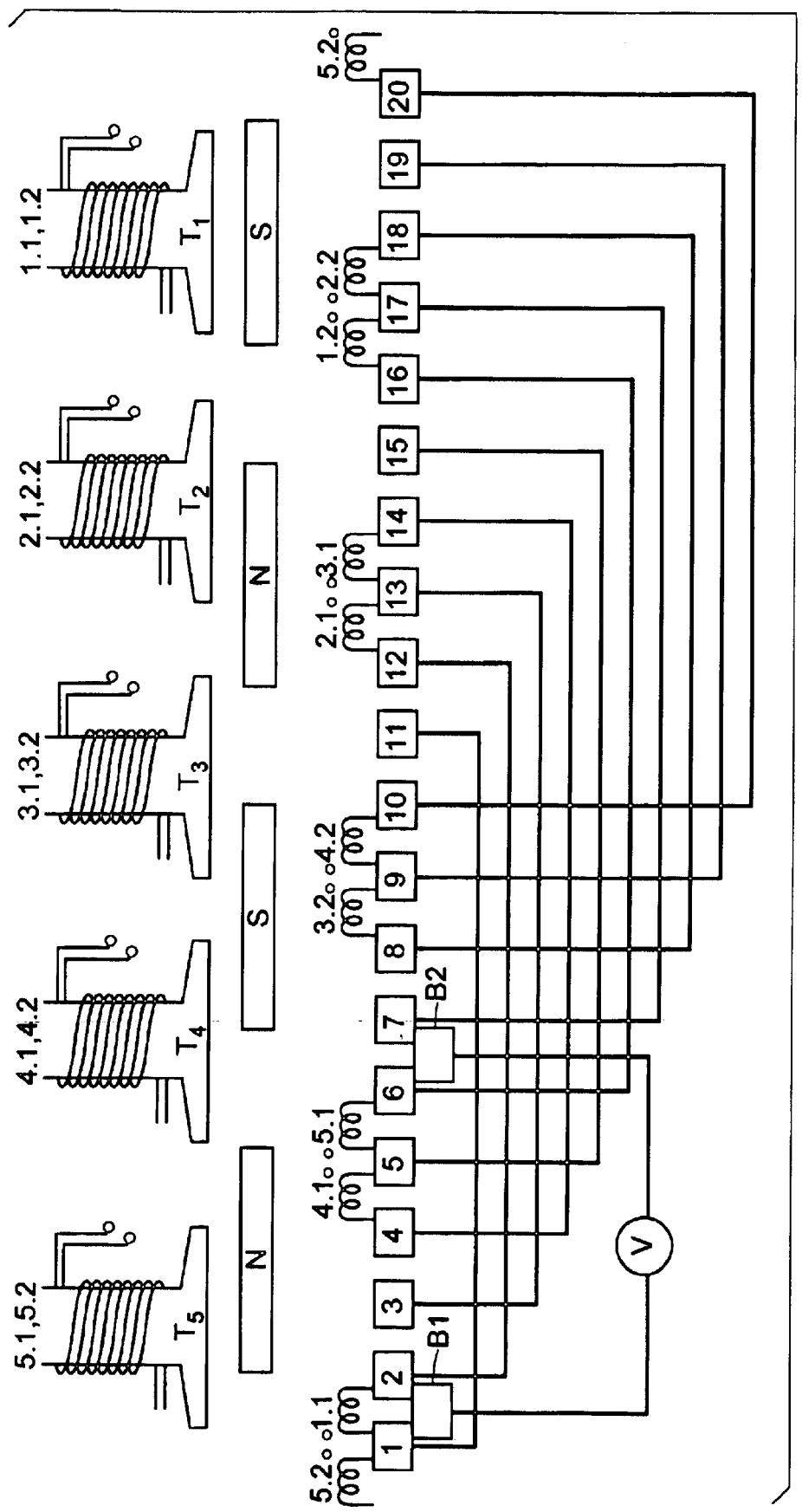
FIG. 11 is a developed diagram of a machine with 5 rotor slots, 4 stator poles, 20 commutator segments and 2 brushes with a rotor winding made of concentrated windings wound around the teeth.

More particularly, FIG. 11 is a developed diagram of a machine with 5 rotor slots, 4 stator poles, 20 commutator segments and 2 brushes with a rotor winding made of concentrated windings wound around the teeth. This machine is an evolution of the machine presented in the FIG. 9 with a reduced number of brushes and equalizer connections are added on the commutator. In this machine, it is also possible to reduce the number of simple coils on each tooth to 2 as is shown in FIG. 11.

Figure 12:
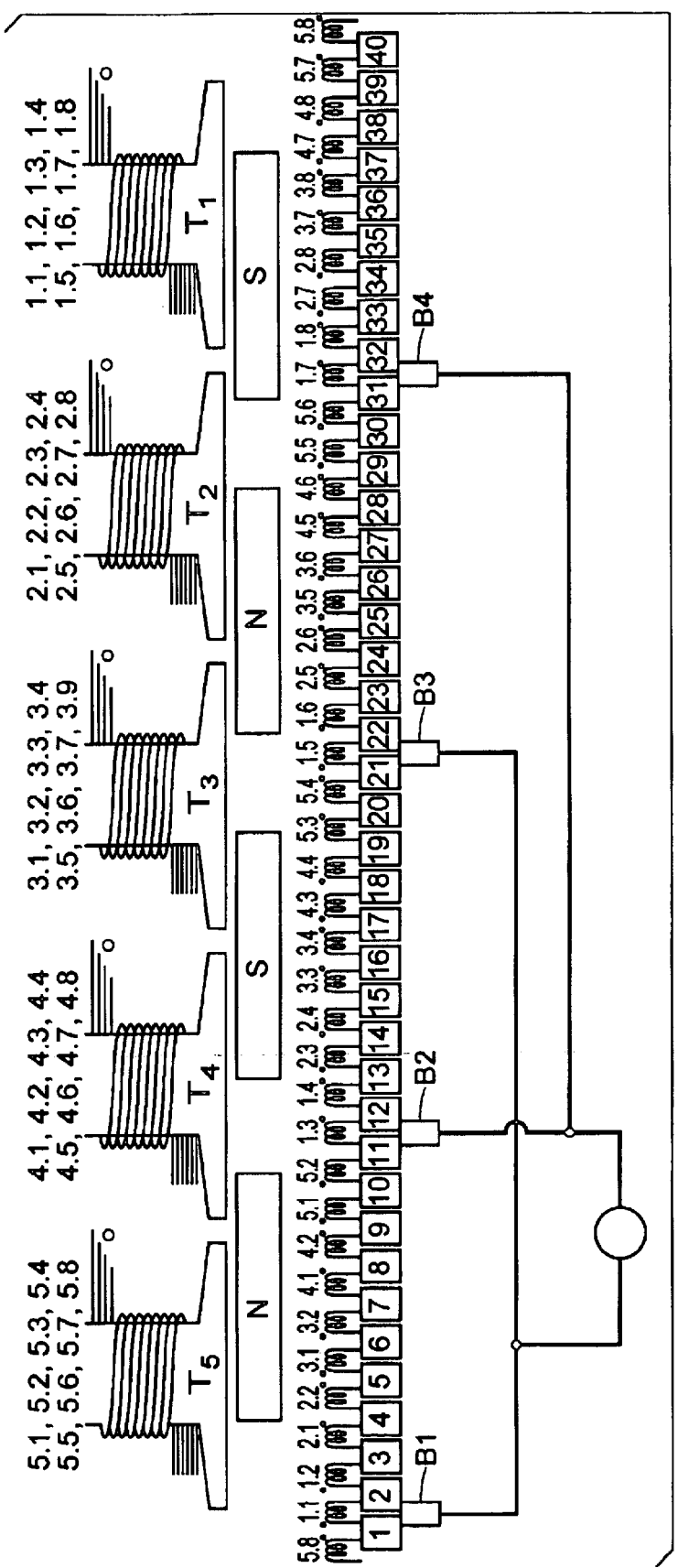
FIG. 12 is a developed diagram of a machine with 5 rotor slots, 4 stator poles, 40 commutator segments and 4 brushes with a rotor winding made of concentrated windings wound around the teeth.

Likewise, FIG. 12 is a developed diagram of a machine with rotor slots, 4 stator poles, 40 commutator segments and 4 brushes with a rotor winding made of concentrated windings wound around the teeth. This machine is an evolution of the machine presented in the FIG. 9 with a higher number of simple coils and number of commutator segments.

Figure 13:
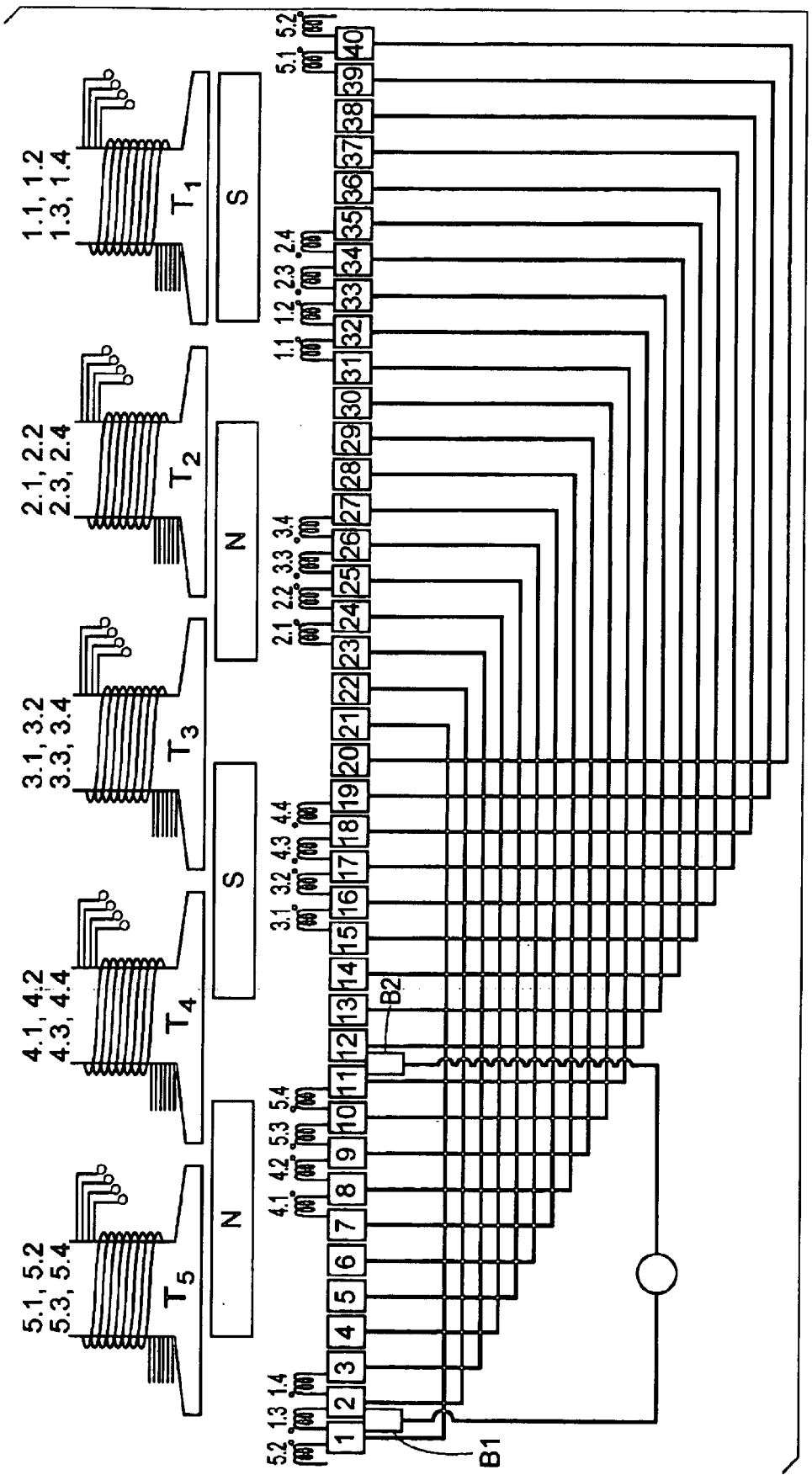
FIG. 13 is a developed diagram of a machine with 5 rotor slots, 4 stator poles, 40 commutator segments and 2 brushes with a rotor winding made of concentrated windings wound around the teeth.

FIG. 13 shows the same structure of motor presented on FIG. 9 with a higher number of commutator segments and a higher simple coil number wound around a tooth, in accordance with the present invention.

More particularly, FIG. 13 is a developed diagram of a machine with 5 rotor slots, 4 stator poles, 40 commutator segments and 2 brushes with a rotor winding made of concentrated windings wound around the teeth. This machine is an evolution of the machine presented in the FIG. 12 with a reduced number of brushes and equalizer connections added on the commutator. The number of segments between 2 brushes of inverse polarity (+ and −) is increased according to the solution presented with respect to FIG. 9 (10 segments vs. 5 segments). Therefore, the voltage between 2 successive segments is lower. This kind of solution is of utility when the supply voltage is high and it permits limiting the amplitude of the voltage between 2 successive segments. It is possible to reduce the number of simple coils on each tooth to 2 in this figure.

Figure 14:
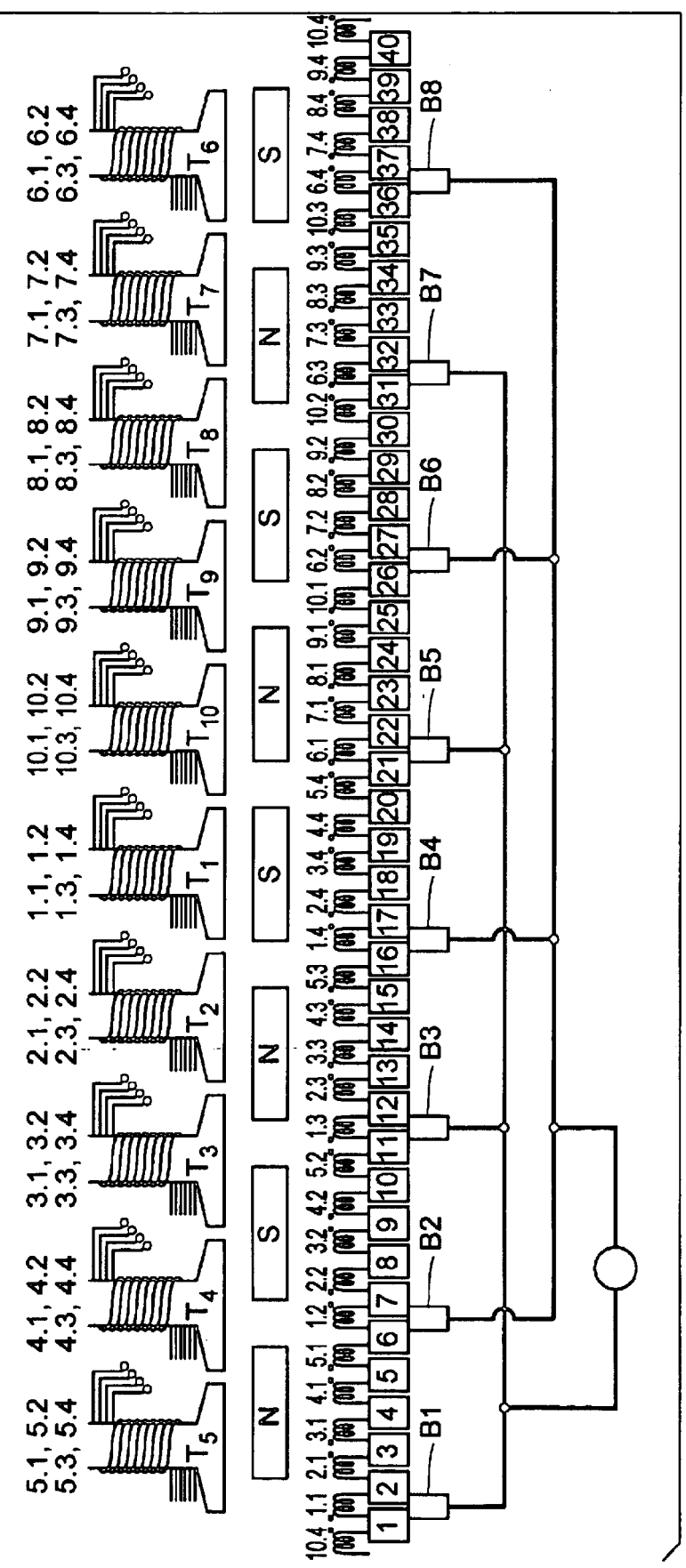
FIG. 14 is a developed diagram of a machine with 10 rotor slots, 8 stator poles, 40 commutator segments and 8 brushes with a rotor winding made of concentrated windings wound around the teeth.

FIG. 14 is an evolution of the solution presented on FIG. 9, in accordance to the present invention, with a higher periodicity of the structure.

More particularly, FIG. 14 is a developed diagram of a machine with 10 rotor slots, 8 stator poles, 40 commutator segments and 8 brushes with a rotor winding made of concentrated windings wound around the teeth. This machine is derived from the machine presented in the FIG. 9 by doubling the periodicity of its structure.

Figure 15:
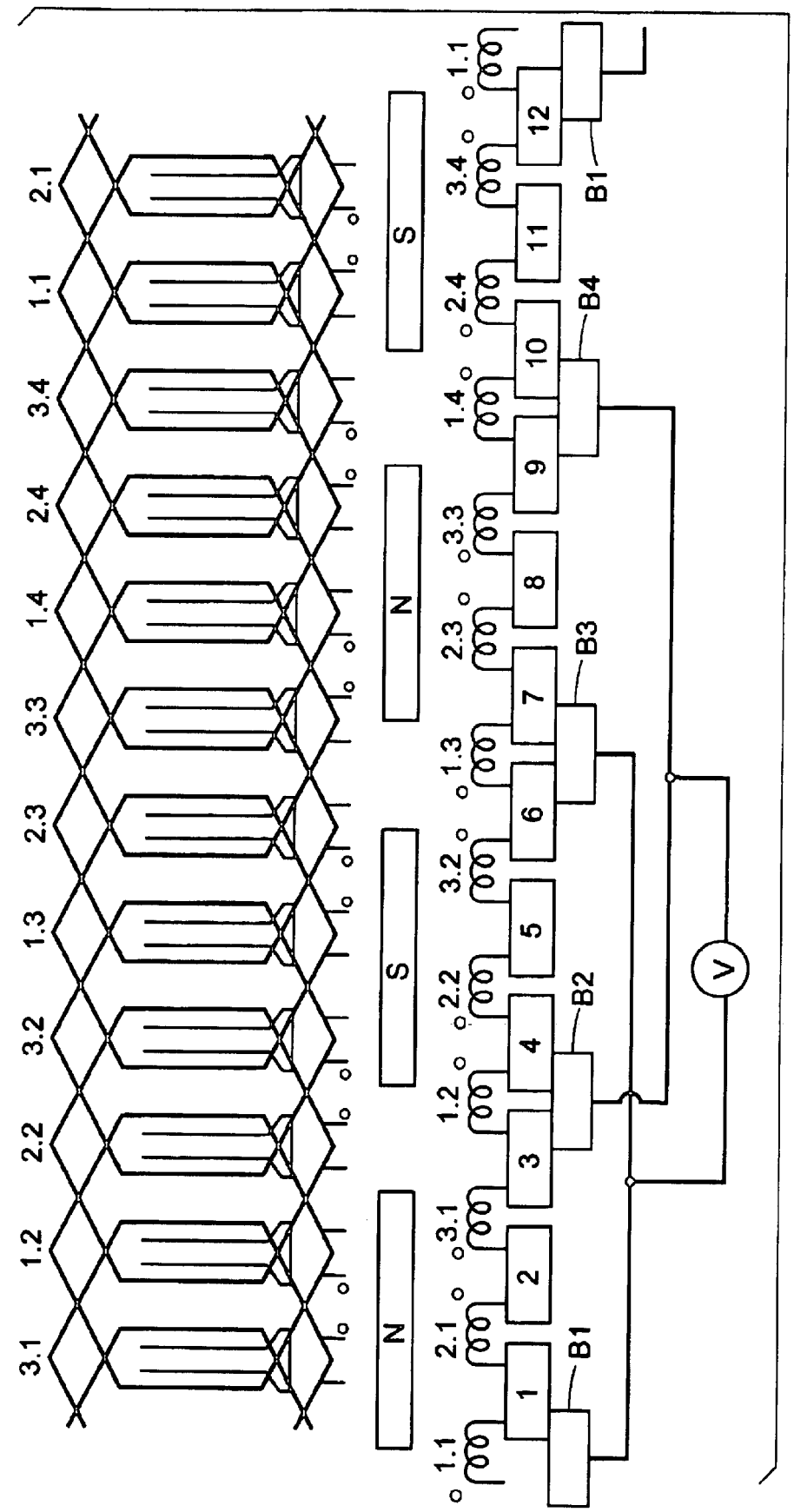
FIG. 15 is a developed diagram of a machine with 12 rotor slots, 4 stator poles, 12 commutator segments, 4 brushes with a simplex lap winding and a diametral pitch.
Figure 16:
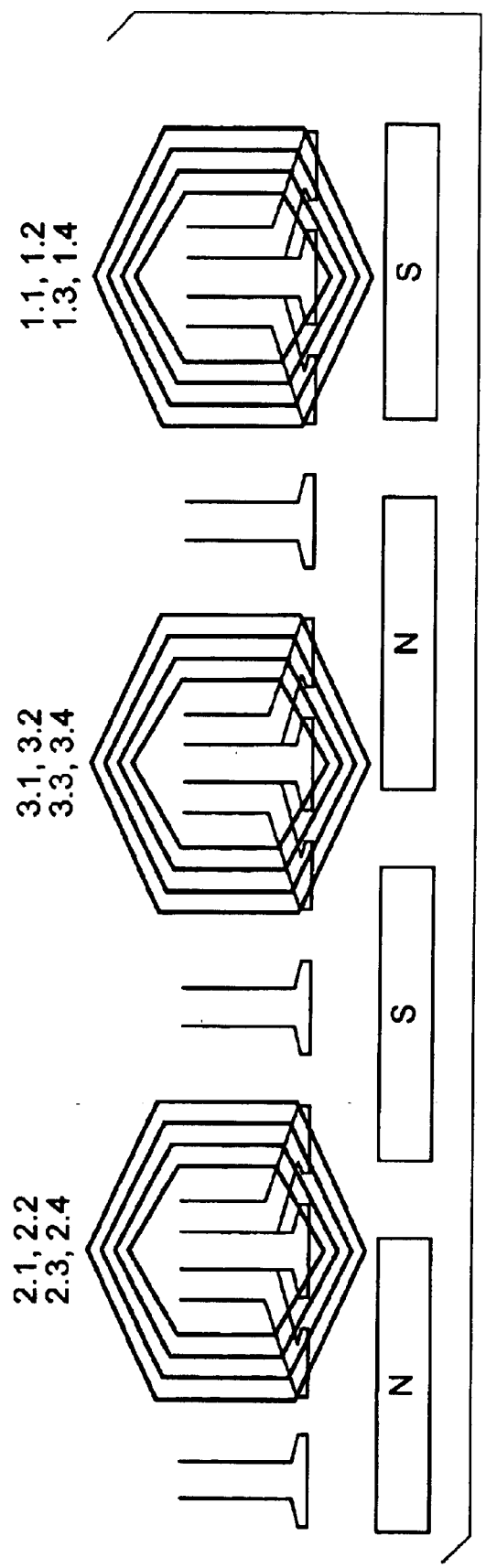
FIG. 16 is a diagram of construction of an equivalent machine of FIG. 15 with a rotor winding made of concentrated windings wound around the teeth.
Figure 17:
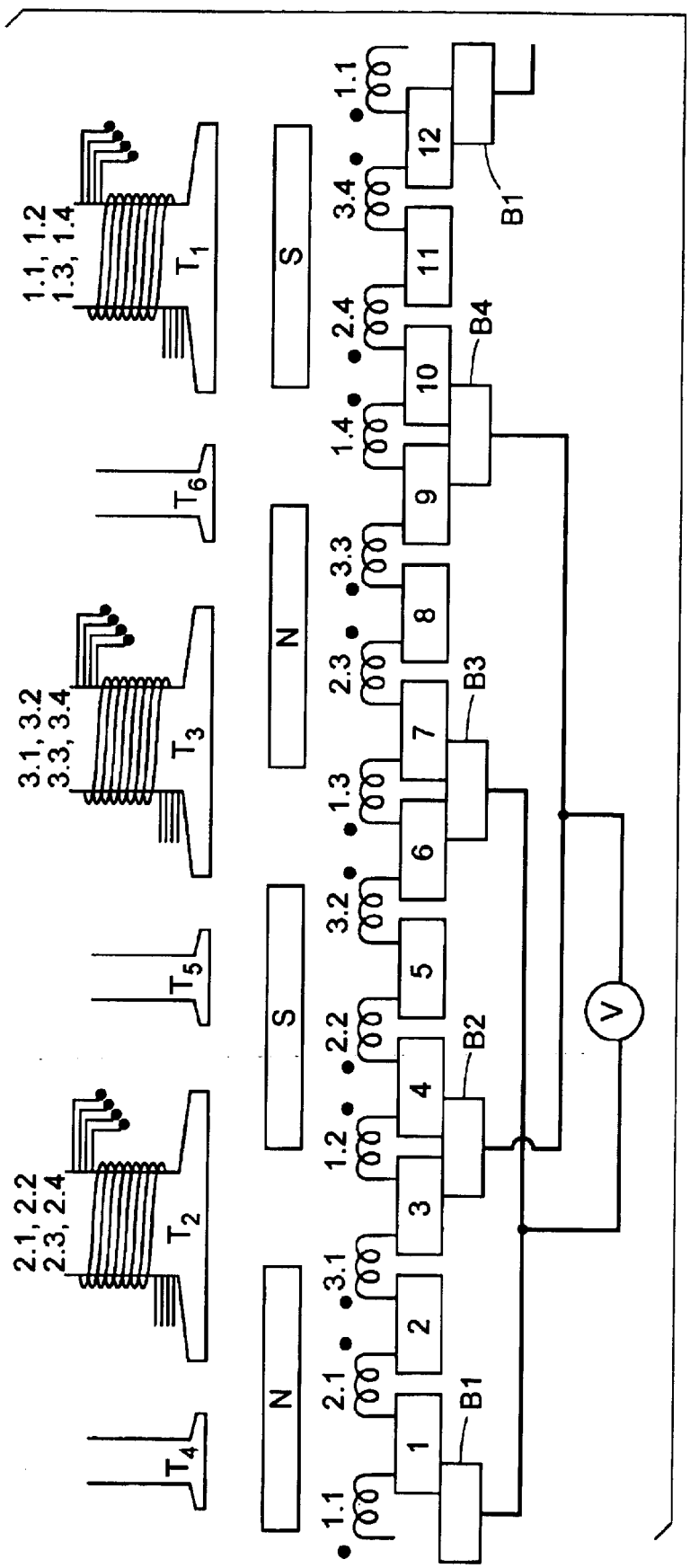
FIG. 17 is a developed diagram of a machine with 6 rotor slots, 4 stator poles, 12 commutator segments and 4 brushes with a rotor winding made of concentrated windings wound around the teeth.

The present invention is applied on FIGS. 16 and 17, which depict a machine with a rotor winding made of concentrated windings and a regular distribution of rotor teeth with two different dimensions. The classical machine for reference presented in FIG. 15 has 12 rotor slots, 4 stator poles, 12 segments on the commutator and 4 brushes. The winding of the rotor is overlapped with a diametral pitch.

FIG. 16 is a diagram of construction of an equivalent machine of FIG. 15, in terms of torque and emf characteristics, magnetic flux and current density, with the rotor winding in FIG. 16 made of concentrated windings wound around the teeth. The coils having emf's which are in phase as coils 1.1, 1.2, 1.3, 1.4 are regrouped on a same tooth. To increase the size of the slots filled with conductors and to preserve the same total copper section of the whole rotor armature in the classical machine of FIG. 15 and in the equivalent machine of FIG. 16 (i.e. the sum of the copper section of each slot), the teeth around the empty slots are regrouped to form the new distribution of teeth presented in FIG. 16. The position of the tooth tips are not modified at the level of the airgap, only the center parts of the teeth of the machine of FIG. 15 between the tooth tips and the inner rotor yoke have been shifted to form a single big tooth. With this method, the pattern of the no-load magnetic flux spatial distribution in the airgap is not modified. The total section of soft magnetic material in the teeth from the original machine of FIG. 15 to the equivalent machine of FIG. 16 is also preserved to avoid a saturation of the magnetic flux. Therefore the total amounts of soft magnetic material in the yoke and copper in the slots are not modified as well. One can notice that all the coils are wound around 3 teeth only. One gets a machine with a concentrated winding presented in FIG. 16 which is equivalent to the initial machine of FIG. 15, as explained above. The shape and the emf amplitude in each coil are not modified.

FIG. 17 is a developed diagram of a machine with 6 rotor slots, 4 stator poles, 12 commutator segments and 4 brushes with a rotor winding made of concentrated windings wound around 3 teeth. There is a regular distribution of rotor teeth of two different dimensions, with teeth T1, T2 and T3 of one dimension, and teeth T4, T5 and T6 of a second dimension. Four simple coils are wound around each tooth and are connected to different segments of the commutator. The connections to the commutator segments are identical to the connections used in the machine presented on the FIG. 15. The coils paths are perfectly balanced. This machine is equivalent to the machine presented in FIG. 15 in terms of torque and emf characteristics, magnetic flux density and current density, with a winding coefficient equal to 1. The performance of this kind of concentrated winding machine is high.

Figure 18:
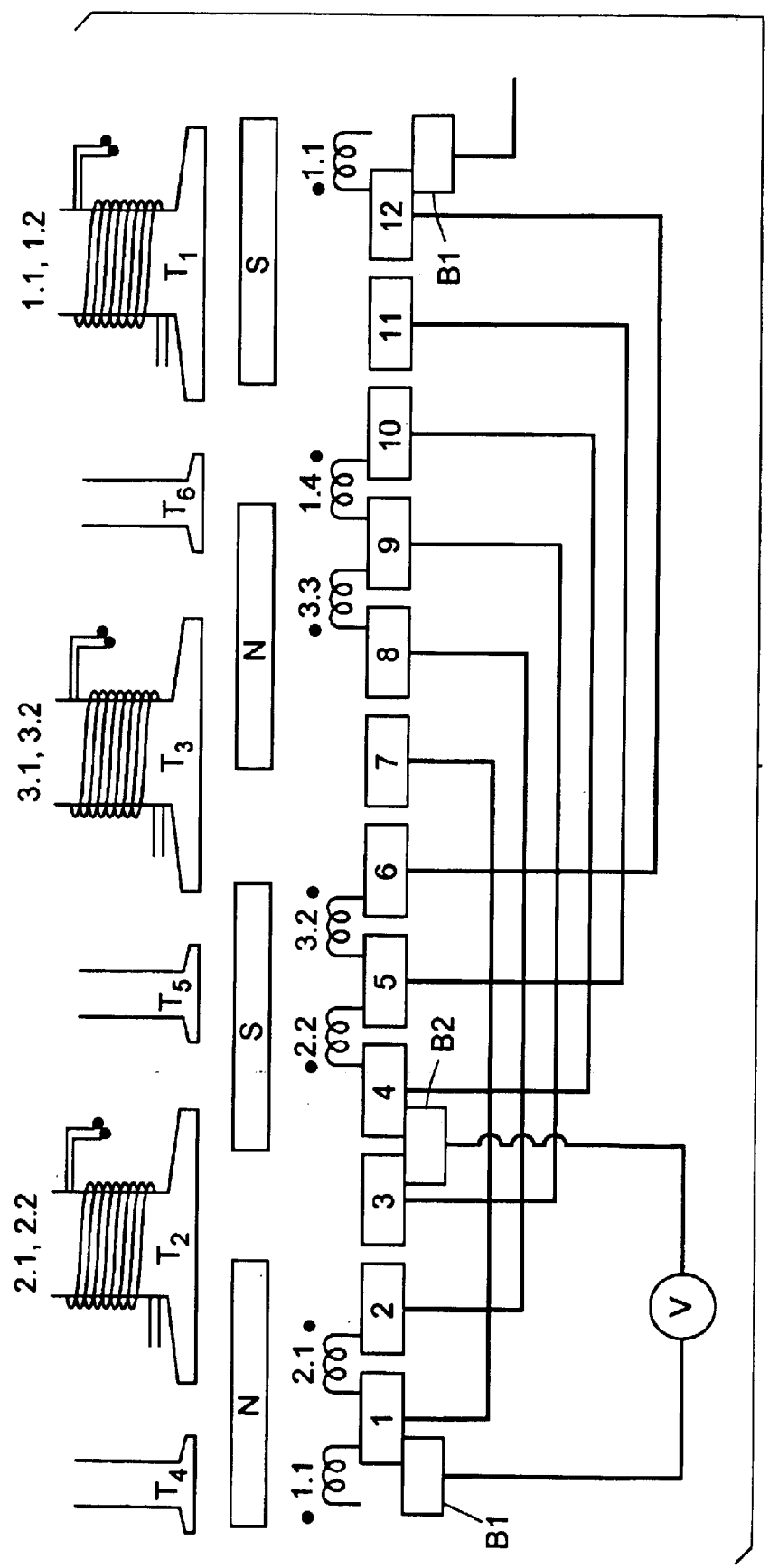
FIG. 18 is a developed diagram of a machine with 6 rotor slots, 4 stator poles, 12 commutator segments, 2 brushes with a rotor winding made of concentrated windings and a regular distribution of rotor teeth with two different dimensions.

In the case of a sub-fractional power machine constructed in accordance with this invention, several modifications can be made to simplify the structure. For example, it is possible to reduce the number of brushes while adding equalizer connections on the commutator. FIG. 18 is a developed diagram of a machine with 6 rotor slots, 4 stator poles, 12 commutator segments, 2 brushes with a rotor winding made of concentrated windings and a regular distribution of rotor teeth with two different dimensions. This machine is an evolution of the machine presented in the FIG. 17 with a reduced number of brushes and equalizer connections added on the commutator. In this machine, it is also possible to reduce the number of simple coils on each tooth to 2 as is shown in FIG. 18.

Figure 19:
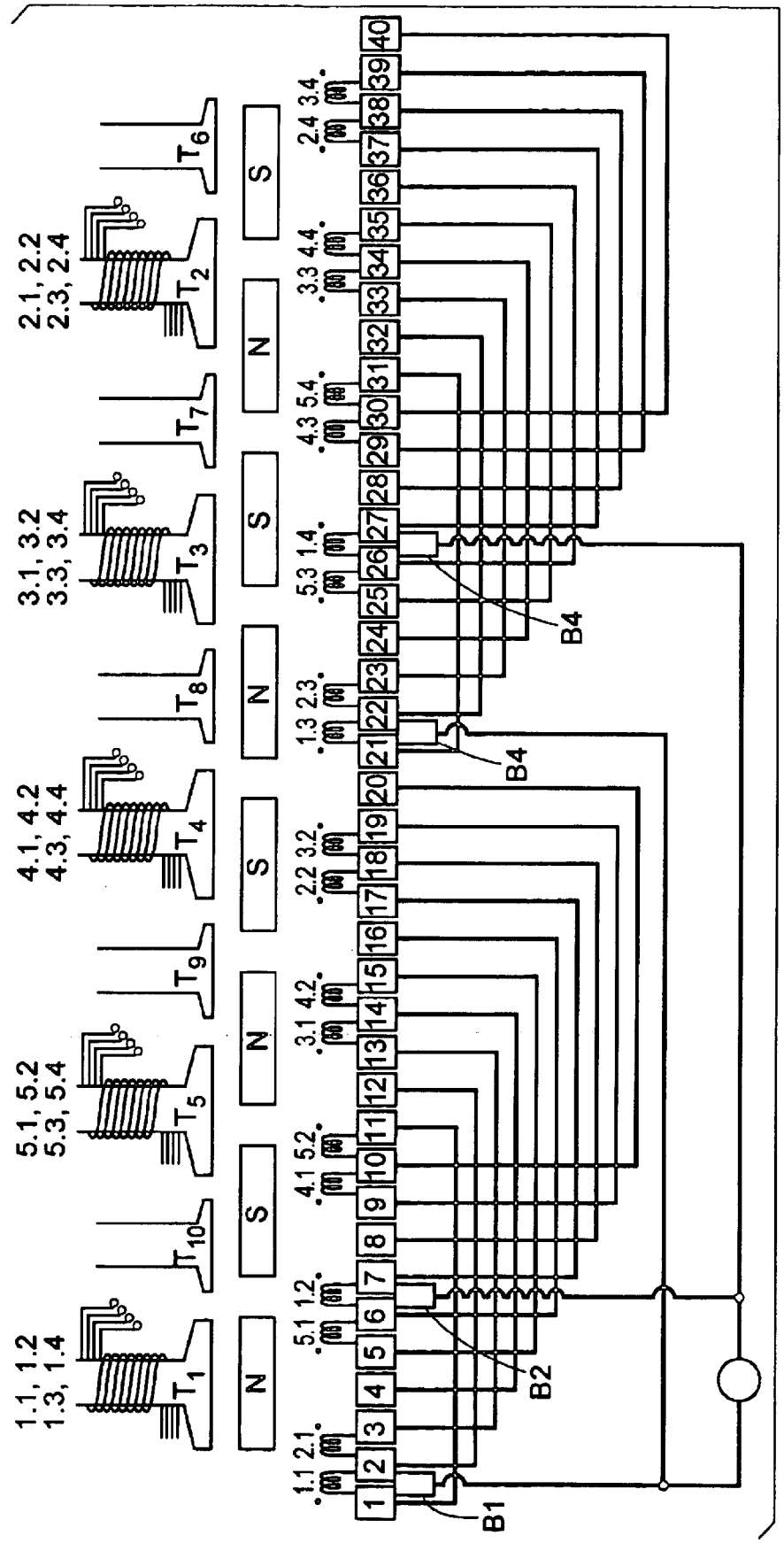
FIG. 19 is a developed diagram of a machine with 10 rotor slots, 8 stator poles, 40 commutator segments, 4 brushes with a rotor winding made of concentrated windings and a regular distribution of rotor teeth with two different dimensions.

FIG. 19 presents the result of another example of a machine with a rotor winding made of concentrated windings and a regular distribution of rotor teeth with two different dimensions. The initial machine has 40 rotor slots, 8 stator poles, 40 segments on the commutator and 8 brushes. The equivalent machine, in accordance to the present invention, has 10 rotor slots with rotor teeth of two different geometrical dimensions (teeth T1 through T5 being of one dimension, and T6 through T10 being of a second dimension), 8 stator poles, 40 segments on the commutator and 4 brushes. There are B simple coils per tooth. Connections of the simple coils on the commutator are the same as the initial machine. It is possible to reduce the number of brushes while adding equalizer connections on the commutator.

Figure 20:
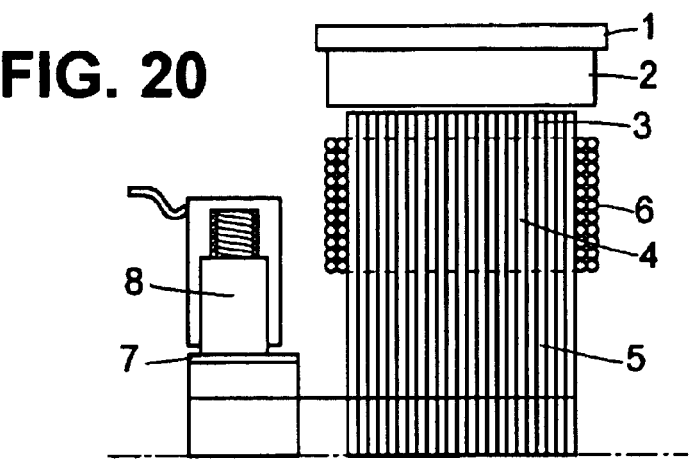
FIG. 20 is the axial sectional view of a permanent magnet motor with a rotor magnetic circuit realized with a laminated steel material.

FIG. 20 is an axial sectional view of a permanent magnet motor with a rotor magnetic circuit realized with a laminated steel material. Usually, the axial dimension of the magnetic circuit of the rotor (parts 3, 4, 5) is lower than the axial length of the permanent magnet. The flux of the permanent magnets is thus concentrated axially into the rotor and it is possible to insert, partially, the end-winding under the permanent magnets axial length. This modification of the axial dimension of the rotor reduces the total axial length of the motor.

Figure 21:
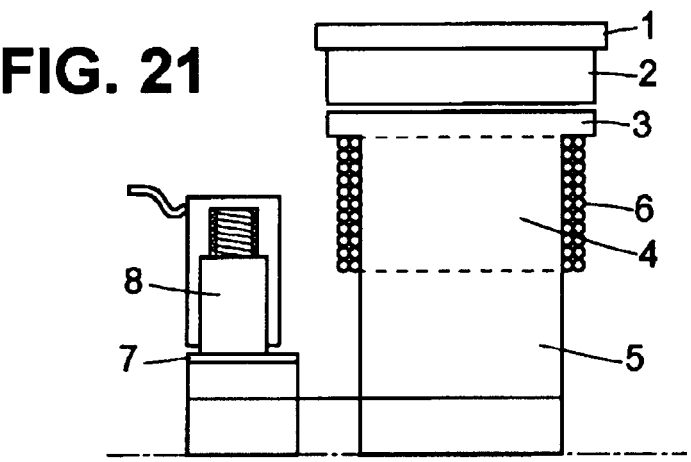
FIG. 21 is the axial sectional view of a permanent magnet motor with a rotor magnetic circuit realized with an isotropic soft magnetic composite material.

FIG. 21 is the axial sectional view of a permanent magnet motor with a rotor magnetic circuit realized with an isotropic soft magnetic composite material. In an isotropic magnetic material, a portion of the magnetic flux can also circulate in the axial direction. It is therefore possible to increase the flux concentration without decreasing the performance of the motor. The center part of the rotor teeth under the coils (part 4) and the rotor yoke (part 5) have the same axial dimension and the tips of the teeth (part 3) have an axial dimension nearly identical to the axial length of the permanent magnets. The total axial length of the motor is reduced when compared to a rotor with a laminated steel (FIG. 20). It is then possible with this structure to maximize the axial length of the active air-gap area for a total axial length fixed by the specifications of the application.

Figure 22:
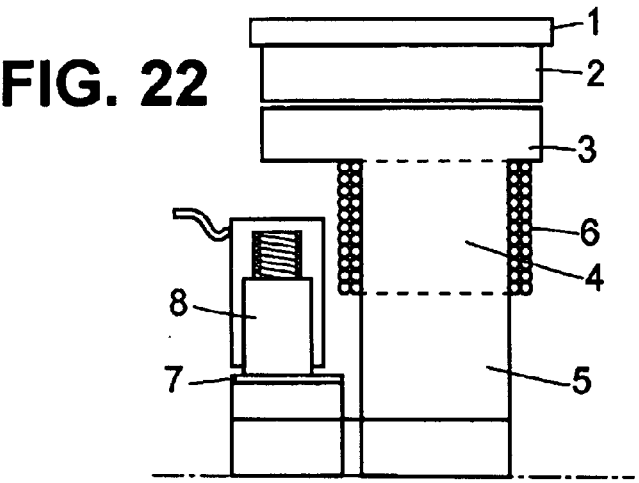
FIG. 22 is the axial sectional view of a motor with a rotor magnetic circuit realized with an isotropic soft magnetic composite material.

FIG. 22 is the axial sectional view of a motor with a rotor magnetic circuit realized with an isotropic soft magnetic composite material. The structure presented on FIG. 22 is an evolution of the structure of the FIG. 21. The center part of the rotor teeth under the coils (part 4) and the rotor yoke (part 5) have the same axial dimension and the tips of the teeth (part 3) have an axial dimension nearly identical to the axial length of the permanent magnets. Part 4 and part 5 are shifted axially. The end-windings, commutator and brushes are inserted partially or totally in the axial direction for a further minimization of the total axial length of the motor.

The proposed motor structures of this invention are very well adapted to the realization of the rotor magnetic circuit with a soft magnetic composite material made of metal powder. With a small number of slots with relatively large dimensions, the mechanical constraints on the direct molding process of the rotor yoke are reduced. An isotropic soft magnetic composite is also well adapted to realize an axial air-gap flux concentration in the rotor or the stator magnetic circuit and to reduce the total axial length of the motor without decreasing the performances of motor. The tips of the teeth can be expanded axially and used to concentrate the magnetic flux in the airgap, axially, into the teeth and the yoke of the rotor or the stator (FIGS. 21 & 22). The axial length of the tips of the rotor teeth can have an axial dimension nearly identical to the axial length of the permanent or the axial length of the tooth tips of the stator. The axial dimension of the teeth and the yoke are the same and can be lower than the axial dimension of the tooth tips (FIGS. 21 & 22). The center part of the rotor teeth under the coils and the rotor yoke can also be decentered and shifted axially (FIG. 22). It is also possible to axially insert the end-windings inside the tooth tips (FIGS. 21 & 22). The commutator and the brushes can also be inserted partially or totally in the axial direction under the rotor tooth tips (FIG. 22). This kind of structure has utility in reducing the total axial length of the motor.

Figure 24:
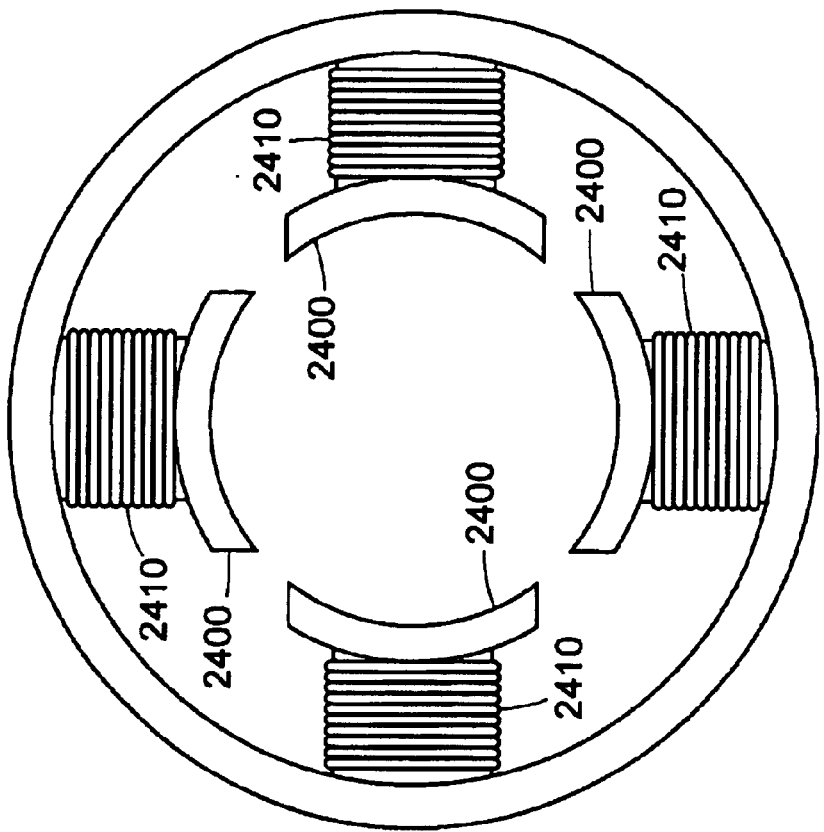
FIG. 24 is a stator tooth wrapped with a stator coil.
Figure 23A:
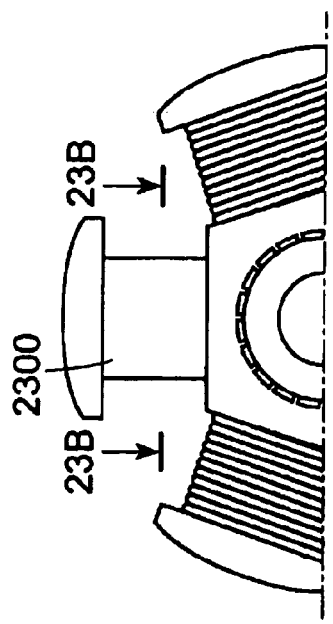
FIG. 23 are rounded, oval, and circular cross-sectional profiles of rotor and stator teeth.
Figure 23B:
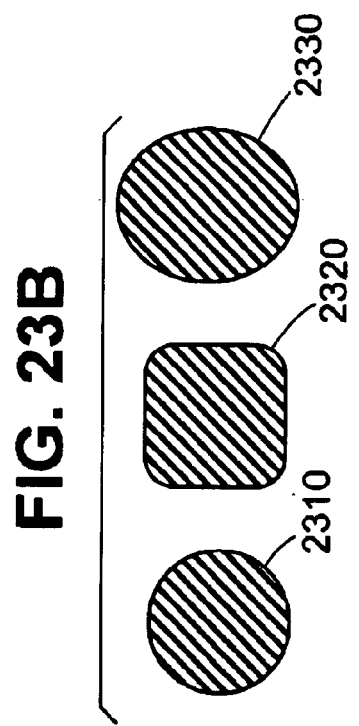

When an isotropic soft magnetic material is used, it is also useful to make the cross-section profile of the center part of the rotor and stator teeth under the coils, rounded, oval, or circular to get a reduction of the risk of destruction of the insulation by a sharp bending of the winding coils, and to maximize the copper filling factor. FIG. 23 shows an example of circular, rounded and oval cross-section profiles (2310, 2320 and 2330, respectively) of rotor tooth 2300. FIG. 24 shows an example of stator teeth 2400 and stator coils 2410.

All the embodiments of this invention can be used with different brush widths. The rotor slots and/or the stator slots can be skewed to reduce the variations of the magnetic reluctance. In the case of a stator with permanent magnets, it is also possible to skew the rotor slots and/or the permanent magnets to reduce the cogging torque. When an isotropic soft magnetic composite is used, it is possible to skew only the tips of the rotor teeth and/or the tips of the stator teeth.

The new structures of DC and AC commutator motor of the present invention can be used in a large variety of applications (automotive applications, electrodomestic appliances, corded electric tools, electric vehicles, fractional and sub-fractional DC and AC commutator motors, etc.). The improved efficiency and the simplifications realized on the rotor winding will provide a lower realization cost and higher performances than classical structures.

While only some embodiments of the present invention are described above, it is obvious that several modifications or simplifications are possible without departing from the spirit of the present invention. Thus, the invention may be applied to motors with a radial airgap or tranversal airgap. Also, the invention can be used in machines having an inner rotor or an outer rotor structure. It is also understood that various further changes and modifications can be made without departing from the spirit and scope of the invention.

We claim:

1. A direct current motor comprising:
    a stator with 2P poles;
    a rotor core, including a core of ferromagnetic material having a number of slots S and a number of teeth S separated from a stator core by an airgap;
    a commutator with a number of segments greater than the number of rotor slots S;
    a concentrated winding rotor, having a plurality of teeth, wherein mounted on each tooth is a plurality of simple non-overlapping coils of insulated wire, with each coil wound around a single tooth only, and wherein each terminal of each coil wound on a tooth is respectively connected to a different segment of the commutator.

2. The direct current motor as in claim 1, wherein each pole comprises a permanent magnet mounted on a surface of a core of a ferromagnetic material.

3. The direct current motor as in claim 1, wherein each pole comprises a coil wound around a tooth made of a ferromagnetic material.

4. A direct current motor as claimed in claim 1, with part of a magnetic circuit realized with a soft magnetic composite made of metal powder.

5. A direct current motor as claimed in claim 4, wherein the stator comprises teeth and a center part of each rotor tooth or each stator tooth under the coils has a rounded, oval, or circular profile, to reduce a risk of destruction of insulation by a sharp bending of windings of the coils, and to maximize a copper filling factor.

6. A direct current motor as claimed in claim 4, wherein:
   an axial length of a center part of teeth under the coils is same as an axial length of a yoke; and
   an axial length of tooth tips is higher than an axial length of the teeth.

7. A direct current motor as claimed in claim 6, wherein end-windings are inserted partially or completely under the tooth tips.

8. A direct current motor as claimed in claim 6, wherein the commutator and brushes are partially or completely inserted under the tooth tips to reduce a total axial length of the motor.

9. A direct current motor as claimed in claim 4, wherein the teeth are not skewed and some tooth tips are skewed to reduce variations magnetic reluctance or a cogging torque.

10. The direct current motor as in claim 1, wherein a plurality of equalizer connections are added on the commutator to reduce a number of brushes.

11. An AC commutator (Universal) motor comprising:
   a stator with 2P poles, each pole comprising a coil wound around a tooth of a core of a ferromagnetic material;
   a rotor core including a core of ferromagnetic material having a number of slots S and a number of teeth S separated from a stator core by an airgap, the stator and the rotor core comprising a magnetic circuit;
   a commutator with a number of segments Z bigger than the number of rotor slots S;
   a concentrated winding rotor having a plurality of teeth, wherein mounted on each tooth is a plurality of simple non-overlapping coils of insulated wire, with each coil wound around a single tooth only, and wherein each terminal of each coil wound on a tooth is respectively connected to a different segment of the commutator.

12. An AC commutator (Universal) motor as claimed in claim 11, wherein a part of magnetic circuit is realized with a soft magnetic composite made of metal powder.

13. An AC commutator (Universal) motor as claimed in claim 12, wherein a center part of each rotor tooth or each stator tooth under the coils has a rounded, oval, or circular profile, to reduce a risk of destruction of insulation by a sharp bending of windings of the coils, and to maximize a copper filling factor.

14. An AC commutator (Universal) motor as claimed in claim 12, wherein:
   an axial length of a center part of teeth under the coils is same as an axial length of a yoke; and
   an axial length of tooth tips is longer than an axial length of the teeth.

15. An AC commutator (Universal) motor as claimed in claim 14, wherein end-windings are inserted partially or completely under the tooth tips.

16. An AC commutator (Universal) motor as claimed in claim 14, wherein the commutator and brushes are partially or completely inserted under the tooth tips to reduce a total axial length of the motor.

17. An AC commutator (Universal) motor as claimed in claim 12, wherein the teeth are not skewed and some tooth tips are skewed to reduce variations magnetic reluctance or a cogging torque.

18. An AC commutator (Universal) motor as in claim 11, wherein a plurality of equalizer connections are added on the commutator to reduce a number of brushes.

* * * * *